US009384707B2

(12) United States Patent
Tanaka et al.

(10) Patent No.: US 9,384,707 B2
(45) Date of Patent: Jul. 5, 2016

(54) DISPLAY DEVICE

(75) Inventors: Kohei Tanaka, Osaka (JP); Yasuhiro Sugita, Osaka (JP)

(73) Assignee: SHARP KABUSHIKI KAISHA, Osaka (JP)

(*) Notice: Subject to any disclaimer, the term of this patent is extended or adjusted under 35 U.S.C. 154(b) by 443 days.

(21) Appl. No.: 13/811,974

(22) PCT Filed: Jul. 26, 2011

(86) PCT No.: PCT/JP2011/066898
§ 371 (c)(1),
(2), (4) Date: Jan. 24, 2013

(87) PCT Pub. No.: WO2012/014861
PCT Pub. Date: Feb. 2, 2012

(65) Prior Publication Data

US 2013/0120332 A1 May 16, 2013

(30) Foreign Application Priority Data

Jul. 27, 2010 (JP) ................................ 2010-168681

(51) Int. Cl.
*G06F 3/042* (2006.01)
*G09G 5/00* (2006.01)
*G09G 3/36* (2006.01)

(52) U.S. Cl.
CPC .............. *G09G 5/003* (2013.01); *G09G 3/3648* (2013.01)

(58) Field of Classification Search
CPC ........................................................ G06F 3/042
USPC .................................. 345/175, 173; 257/444
See application file for complete search history.

(56) References Cited

U.S. PATENT DOCUMENTS

2010/0084642 A1 4/2010 Hanari
2010/0238135 A1* 9/2010 Brown et al. ................ 345/175
2012/0176357 A1 7/2012 Katoh et al.

FOREIGN PATENT DOCUMENTS

JP 2006-003857 A 1/2006
JP 2010-091610 A 4/2010

(Continued)

OTHER PUBLICATIONS

Official Communication issued in International Patent Application No. PCT/JP2011/066898, mailed on Aug. 30, 2011.

*Primary Examiner* — Amare Mengistu
*Assistant Examiner* — Shawna Stepp Jones
(74) *Attorney, Agent, or Firm* — Keating & Bennett, LLP

(57) ABSTRACT

A display device including optical sensors in a pixel region, in which the number of bus lines for supplying driving signals to the optical sensors is reduced, is provided. The display device includes a display pixel circuit (8) and a sensor pixel circuit (9) that are provided in a pixel region (4) of an active matrix substrate. The sensor pixel circuit (9) includes: a light receiving element (D1); an accumulation node for accumulating charges corresponding to an amount of light incident on the light receiving element (D1); and a readout switching element (T2) that reads out charges in the accumulation node. The display device further includes; a driving circuit that supplies a sensor driving signal for controlling a resetting operation and an accumulating operation of the accumulation node, to the sensor pixel circuit (9), via a source line (SL) for supplying a display data signal to the display pixel circuit (8); and a protection switching element (M1), (M2) connected to a sensor control line (EL) provided in addition to the source line (SL), the protection switching element protecting the sensor signal of the sensor pixel circuit.

5 Claims, 24 Drawing Sheets

(56) References Cited

FOREIGN PATENT DOCUMENTS

| | | | |
|---|---|---|---|
| WO | 03/038798 | A2 | 5/2003 |
| WO | 2007/145346 | A1 | 12/2007 |
| WO | 2007/145347 | A1 | 12/2007 |
| WO | 2011/040091 | A1 | 4/2011 |

* cited by examiner

DISPLAY DEVICE

TECHNICAL FIELD

The present invention relates to a display device, and particularly relates to a display device provided with a plurality of optical sensors in a pixel region.

BACKGROUND ART

Conventionally, relating to a display device, a method of providing an input function such as a touch panel, pen input, or a scanner by providing a plurality of optical sensors in a display panel has been known. Recently, particularly a display device obtained by a method in which light receiving elements such as photodiodes are formed in a pixel region concurrently when semiconductor elements of display pixels are formed in a pixel region has been known widely as well (see, for example, the gazette of JP2006-3857, the gazette of WO2007/145346, and the gazette of WO2007/145347).

In the case where optical sensors are provided in a pixel region, however, bus lines for supplying driving signals to optical sensors are needed in addition to bus lines (lines) for supplying driving signals to display pixel circuits in the pixel region, which decreases the pixel aperture ratio.

DISCLOSURE OF INVENTION

In light of the above-described problem, it is an object of the present invention to provide a display device provided with optical sensors in a pixel region in which the number of bus lines for supplying driving signals to the optical sensors is reduced.

A display device disclosed herein is a display device including an active matrix substrate, and the display device has a configuration that includes a display pixel circuit and a sensor pixel circuit that are provided in a pixel region of the active matrix substrate, wherein the sensor pixel circuit includes: a light receiving element; an accumulation node for accumulating charges corresponding to an amount of light incident on the light receiving element; and a readout switching element that reads out charges in the accumulation node, and the display device further includes; a driving circuit that supplies a sensor driving signal for controlling a resetting operation and an accumulating operation of the accumulation node, to the sensor pixel circuit, via a source line for supplying a display data signal to the display pixel circuit; and a protection switching element connected to a sensor control line provided in addition to the source line, the protection switching element protecting the sensor signal of the sensor pixel circuit.

The present invention makes it possible to provide a display device having optical sensors in a pixel region, in which the number of bus lines for supplying driving signals to the optical sensors is reduced.

DESCRIPTION OF THE INVENTION

Figure 1:
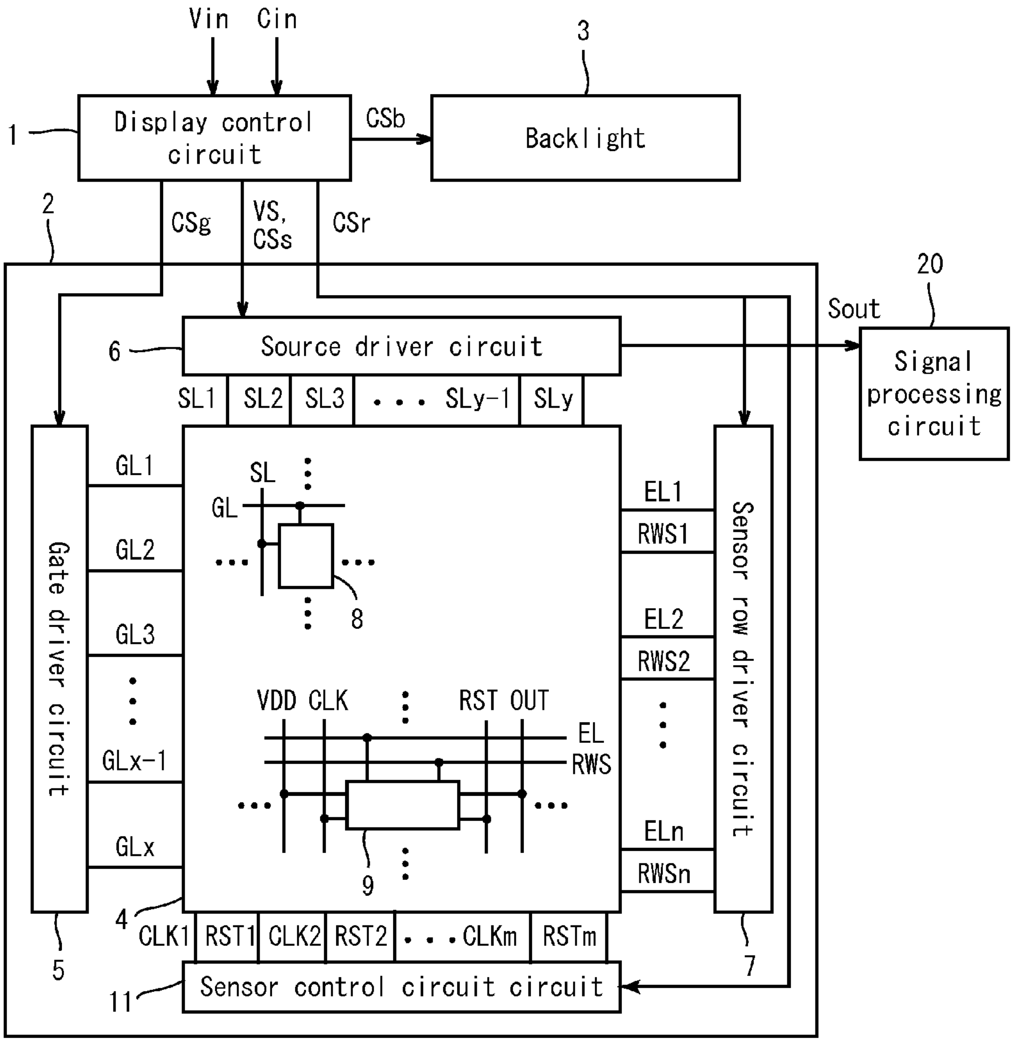
FIG. 1 is a block diagram showing a configuration of a display device according to an embodiment of the present invention.

A display device according to one embodiment of the present invention is a display device that includes an active matrix substrate, and includes a display pixel circuit and a sensor pixel circuit that are provided in a pixel region of the active matrix substrate, wherein the sensor pixel circuit includes:

a light receiving element;

an accumulation node for accumulating charges corresponding to an amount of light incident on the light receiving element; and a readout switching element that reads out charges in the accumulation node, the display device further comprising;

a driving circuit that supplies a sensor driving signal for controlling a resetting operation and an accumulating operation of the accumulation node, to the sensor pixel circuit, via a source line for supplying a display data signal to the display pixel circuit; and a protection switching element connected to a sensor control line provided in addition to the source line, the protection switching element protecting the sensor signal of the sensor pixel circuit (first configuration).

In the above-described first configuration, the sensor control line is preferably provided perpendicularly to the source line in the pixel region (second configuration).

In the above-described first or second configuration, preferably, the sensor pixel circuit further includes a control switching element connected to between the light receiving element and the accumulation node, wherein the protection switching element includes:

a first protection switching element connected to between the light receiving element and a source line for supplying a reset voltage to the light receiving element; and a second protection switching element connected to between the control switching element and the accumulation node (third configuration).

The above-described first or second configuration may be such that the sensor pixel circuit includes a first sensor pixel circuit and a second sensor pixel circuit each of which includes the accumulation node and the readout switching element, the first sensor pixel circuit and the second sensor pixel circuit share the light receiving element, and each of the first sensor pixel circuit and the second sensor pixel circuit further includes a control switching element connected to between the light receiving element and the accumulation node, wherein the protection switching element includes:

a first protection switching element connected to between the light receiving element and a source line for supplying a reset voltage to the light receiving element; and a second protection switching element connected to between the control switching element and the accumulation node in each of the first sensor pixel circuit and the second sensor pixel circuit (fourth configuration).

Alternatively, the above-described first or second configuration may be such that the sensor pixel circuit further includes:

a control switching element connected to between the light receiving element and the accumulation node;

an accumulation capacitor provided between the control switching element and the accumulation node; and a switching element connected to between the accumulation capacitor and the accumulation node, wherein the protection switching element includes:

a first protection switching element connected to between the light receiving element and a source line for supplying a reset voltage to the light receiving element; and a second protection switching element connected to between the accumulation capacitor and the accumulation node (fifth configuration).

The above-described first or second configuration may be such that the sensor pixel circuit further includes:

a control switching element connected to between the light receiving element and the accumulation node; and a reset switching element connected to between the control switching element and the accumulation node, the reset switching element controlling a resetting operation, wherein the protection switching element includes:

a first protection switching element connected to between the light receiving element and a source line for supplying a constant voltage to the light receiving element; and a second protection switching element connected to between the control switching element and the accumulation node (sixth configuration).

The above-described first or second configuration may be such that the sensor pixel circuit further includes:

a control switching element connected to between the light receiving element and the accumulation node;

an accumulation capacitor connected to between the control switching element and the accumulation node; and a reset switching element connected to between the control switching element and the accumulation capacitor, the reset switching element controlling a resetting operation; and a switching element connected to between the accumulation capacitor and the accumulation node, wherein the protection switching element includes:

a first protection switching element connected to between the light receiving element and a source line for supplying a constant voltage to the light receiving element; and a second protection switching element connected to between the accumulation capacitor and the accumulation node (seventh configuration).

The above-described first or second configuration may be such that the sensor pixel circuit further includes:

a reset switching element connected to the light receiving element, the reset switching element controlling a resetting operation, wherein the protection switching element includes:

a first protection switching element connected to between the light receiving element and a source line for supplying a constant voltage to the light receiving element; and a second protection switching element connected to between a junction point between the light receiving element and the reset switching element, and the accumulation node (eighth configuration).

The above-described first or second configuration may be such that the sensor pixel circuit further includes:

a reset switching element connected to the light receiving element, the reset switching element controlling a resetting operation; and a readout control switching element connected to the readout switching element, the readout control switching element controlling a readout operation, wherein the protection switching element includes:

a first protection switching element connected to between the light receiving element and a source line for supplying a constant voltage to the light receiving element; and a second protection switching element connected to between a junction point between the light receiving element and the reset switching element, and the accumulation node (ninth configuration).

Alternatively, the above-described first or second configuration may be such that the sensor pixel circuit further includes:

a reset switching element connected to the light receiving element, the reset switching element controlling a resetting operation; and a readout control switching element connected to the readout switching element, the readout control switching element controlling a readout operation, wherein the protection switching element includes:

a first protection switching element connected to between the light receiving element and a source line for supplying a constant voltage to the light receiving element; and a second protection switching element connected to between a junction point between the light receiving element and the reset switching element, and the accumulation node, wherein the light receiving element is formed with a transistor of the same type as that of the switching element included in the sensor pixel circuit (tenth configuration).

In the above-described first to tenth configurations, the driving circuit preferably performs a sensor driving signal for controlling the resetting operation and the accumulating operation, in a flyback period in a period for driving the display pixel circuit (eleventh configuration).

In the above-described eleventh configuration, the driving circuit preferably performs a sensor driving signal for controlling the resetting operation and the accumulating operation, in a vertical flyback period in a period for driving the display pixel circuit (twelfth configuration).

The above-described first to twelfth configurations may be such that the display device further includes:

a counter substrate opposed to the active matrix substrate; and liquid crystal interposed between the active matrix substrate and the counter substrate (thirteenth configuration).

[Embodiment]

Hereinafter, more specific embodiments of the present invention are explained with reference to the drawings. It should be noted that the following embodiments show exemplary configurations in the case where a display device according to the present invention is embodied as a liquid crystal display device, but the display device according to the present invention is not limited to a liquid crystal display device, and the present invention is applicable to an arbitrary display device in which an active matrix substrate is used. It should be noted that a display device according to the present invention, as having optical sensors, is assumed to be used as a touch-panel-equipped display device that detects an object approaching its screen and carries out an input operation, as a display device for two-way communication having a display function and an image pickup function, etc.

Further, the drawings referred to hereinafter show, in a simplified manner, only principal members illustration of which is needed for explanation of the present invention, among constituent members of an embodiment of the present invention, for convenience of explanation. Therefore, a display device according to the present embodiment may include arbitrary members that are not shown in the drawings that the present specification refers to. Further, the dimensions of the members shown in the drawings do not faithfully reflect actual dimensions of constituent members, dimensional ratios of the constituent members, etc.

[Overall Configuration of Display Device]

FIG. 1 is a block diagram showing a configuration of a display device according to Embodiment 1 of the present invention. A display device shown in FIG. 1 includes a display control circuit 1, a display panel 2, and a backlight 3. The display panel 2 includes a pixel region 4, a gate driver circuit 5, a source driver circuit 6, a sensor row driver circuit 7, and a sensor control circuit 11. The pixel region 4 includes a plurality of display pixel circuits 8 and a plurality of sensor pixel circuits 9. This display device has a function of displaying images on the display panel 2 and a function of detecting light incident on the display panel 2. In the following description, x represents an integer of 2 or more, y represents a multiple of 3, and m and n represent even integers, respectively, while the display device has a frame rate of 60 frames per second.

To the display device shown in FIG. 1, a video signal Vin and a timing control signal Cin are supplied from outside. Based on these signals, the display control circuit 1 outputs a video signal VS and control signals CSg, CSs, and CSr to the display panel 2, and outputs a control signal CSb to the backlight 3. The video signal VS may be identical to the video signal Vin, or alternatively, a signal obtained by subjecting the video signal Vin to signal processing.

The backlight 3 is a light source for sensing that is provided in addition to a light source for display, and irradiates the display panel 2 with light. More specifically, the backlight 3 is provided on a back side of the display panel 2, and irradiates a back face of the display panel 2 with light. The backlight 3 is turned on when the control signal CSb is at a high level, while it is turned off when the control signal CSb is at a low level. As the backlight 3, an infrared light source can be used, for example.

In the pixel region 4 of the display panel 2, the display pixel circuits 8, which are (x×y) in number, and the sensor pixel circuits 9, which are (n×m/2) in number, are provided two-dimensionally, respectively. More specifically, x gate lines GL1 to GLx, and y source lines SL1 to Sly are provided in the pixel region 4. The gate lines GL1 to GLx are arranged in parallel with one another, and the source lines SL1 to SLy are arranged in parallel with one another, so as to cross the gate lines GL1 to GLx orthogonally. The (x×y) display pixel circuits 8 are arranged in the vicinities of intersections of the gate lines GL1 to GLx and the source lines SL1 to SLy. Each display pixel circuit 8 is connected to one gate line GL and one source line SL. The display pixel circuits 8 are classified into those for displaying red, those for displaying green, and those for displaying blue. Every three of the display pixel circuits 8 that belong to these three types, respectively, are aligned in a direction in which the gate lines GL1 to GLx are extended, and constitute one color pixel.

In the pixel region 4, n sensor control lines EL1 to ELn, and n readout lines RWS1 to RWSn are provided in parallel with the gate lines GL1 to GLx.

Figure 2:
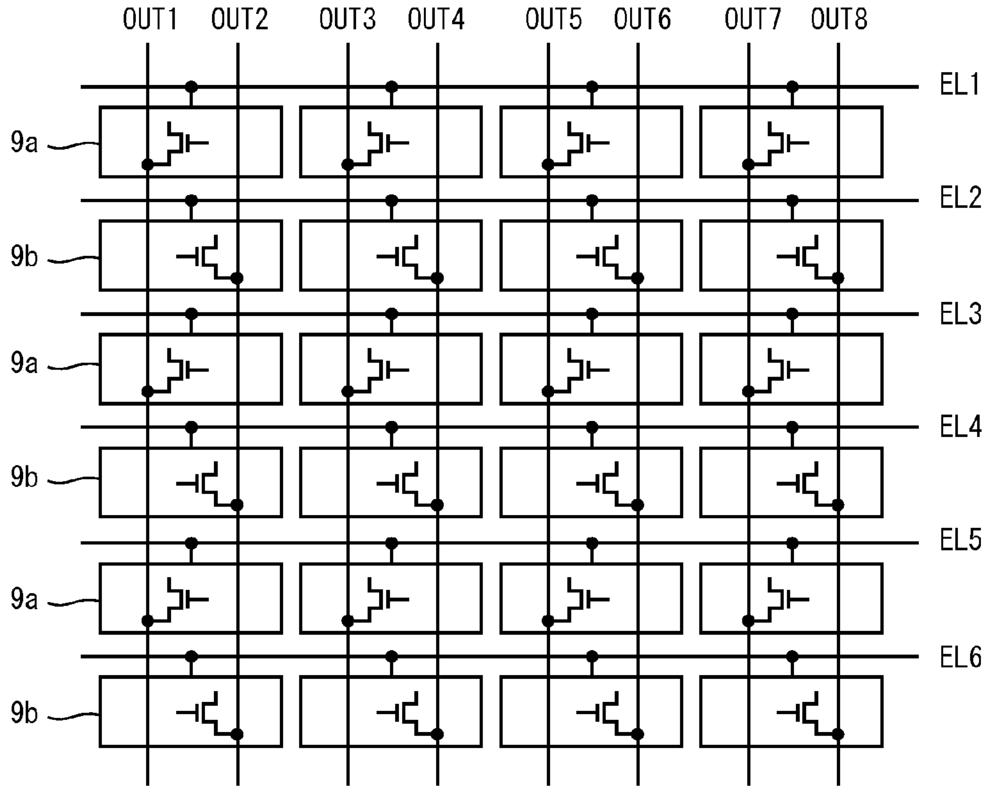
FIG. 2 shows an arrangement of sensor pixel circuits in a pixel region.

FIG. 2 shows an arrangement of the sensor pixel circuits 9 in the pixel region 4. The (n×m/2) sensor pixel circuits 9 include first sensor pixel circuits 9*a* that detect light incident during a backlight-on period of the backlight 3, and second sensor pixel circuits 9*b* that detect light incident during a backlight-off period of the backlight 3. The number of the first sensor pixel circuits 9*a* and the number of the second sensor pixel circuits 9*b* are the same. In FIG. 2, the (n×m/4) first sensor pixel circuits 9*a* are provided in the vicinities of intersections of the odd-number-th sensor control lines EL1 to ELn−1 and the odd-number-th output lines OUT1 to OUTm−1. The (n×m/4) second sensor pixel circuits 9*b* are provided in the vicinities of intersections of the even-number-th sensor control lines EL2 to ELn and the even-number-th output lines OUT2 to OUTm. In this way, the display panel 2 includes the plurality of output lines OUT1 to OUTm for transmitting output signals of the first sensor pixel circuits 9*a* and output signals of the second sensor pixel circuits 9*b*, and the first sensor pixel circuits 9*a* and the second sensor pixel circuits 9*b* are connected to different output lines depending on such classification.

The gate driver circuit 5 drives the gate lines GL1 to GLx. More specifically, the gate driver circuit 5 sequentially selects the gate lines GL1 to GLx one by one based on the control signal CSg, and applies a high-level potential to the selected gate line, while applying a low level potential to the other gate lines. By doing so, y display pixel circuits 8 connected to the selected gate line are selected at once.

The source driver circuit 6 drives the source lines SL1 to SLy. More specifically, based on the control signal CSs, the source driver circuit 6 applies potentials according to the video signal VS to the source lines SL1 to SLy, respectively. Here, the source driver circuit 6 may perform line-sequential driving, or alternatively, dot-sequential driving. The potentials applied to the source lines SL1 to SLy are written in y display pixel circuits 8 selected by the gate driver circuit 5. In this way, by writing potentials corresponding to the video signals VS into all of the display pixel circuits 8, respectively, using the gate driver circuit 5 and the source driver circuit 6, desired images can be displayed on the display panel 2.

The sensor row driver circuit 7 drives the sensor control lines EL1 to ELn, the readout lines RWS1 to RWSn, and the like. More specifically, based on the control signal CSr, the sensor row driver circuit 7 supplies a high-level potential to the sensor control lines EL1 to ELn simultaneously at predetermined timings, which will be described in more detail later. Based on the control signal CSr, the sensor row driver circuit 7 selects the readout lines RWS1 to RWSn one by one sequentially, and applies a high-level potential for readout to the selected readout line, while applying a low level potential to the other readout lines. Thus, m sensor pixel circuits 9 connected to the one selected readout line assume a readable state at once. Here, the source driver circuit 6 applies a high-level potential to the power source lines VDD1 to VDDm. This causes signals corresponding to amounts of light detected by the respective sensor pixel circuits 9 (hereinafter referred to as sensor signals) to be output from the m sensor pixel circuits 9 ready to be read out to the output lines OUT1 to OUTm. The output lines OUT double as the source lines SL, and the sensor signals output to the output lines OUT are input to the source driver circuit 6.

The source driver circuit 6 amplifies the sensor signal output from the output line OUT, and outputs the amplified signal as a sensor output Sout to the outside of the display panel 2. The sensor output Sout is processed appropriately as required by the signal processing circuit 20 provided outside the display panel 2. In this way, by reading out sensor signals from all the sensor pixel circuits 9 by using the source driver circuit 6 and the sensor row driver circuit 7, light incident on the display panel 2 can be detected.

The sensor control circuit 11 drives the clock lines CLK1 to CLKm, the reset lines RST1 to RSTm, and the like. Based on the control signal CSr, the sensor control circuit 11 supplies the high-level potential at predetermined timings to the clock lines CLK1 to CLKm and the reset lines RST1 to RSTm, which will be described in detail later. It should be noted that the source driver circuit 6 and the sensor control circuit 11 may be integrated together.

[Configuration of Sensor Pixel Circuit]

Here, the configuration of the sensor pixel circuit 9 is explained with reference to the drawings. In the following explanation, signals on signal lines are referred to with the same names as the names of the signal lines, so that the signals can be distinguished (for example, the signal on the sensor control line EL1 is referred to as "a sensor control signal EL1").

Figure 3A:
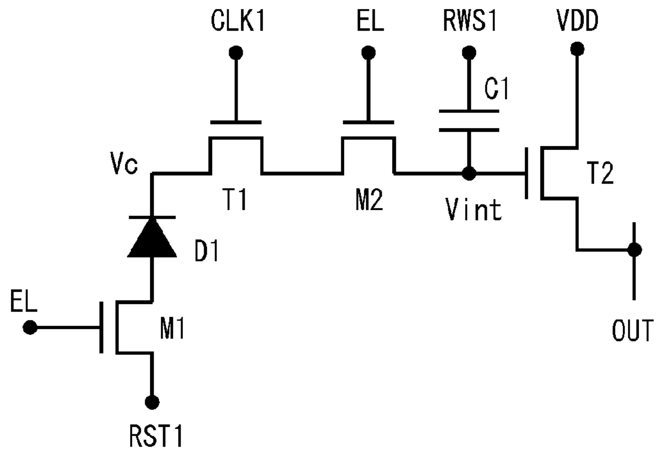
FIG. 3A is a circuit diagram showing a configuration of the sensor pixel circuit according to Embodiment 1.
Figure 3B:
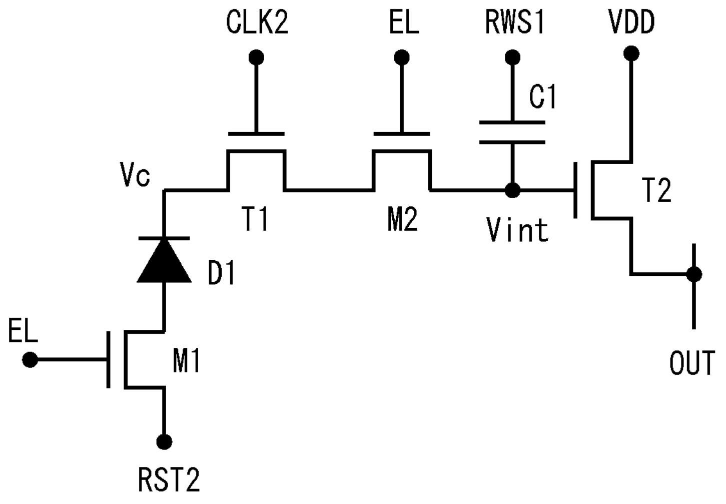
FIG. 3B is a circuit diagram showing a configuration of a first sensor pixel circuit according to Embodiment 1.

FIGS. 3A and 3B are circuit diagrams showing configurations of a first sensor pixel circuit 9*a* and a second sensor pixel circuit 9*b* shown in FIG. 2. As shown in FIG. 3A, the first sensor pixel circuit 9*a* includes a photodiode D1, transistors T1, T2, M1, and M2, as well as a capacitor C1. The transistors T1, T2, M1, and M2 are, for example, N-type TFTs (thin film transistors). The anode of the photodiode D1 is connected to the drain of the transistor M1, and the cathode thereof is connected to the source of the transistor T1. The gate of the transistor T1 is connected to the clock line CLK1, and the drain thereof is connected to the source of the transistor M2. The gate of the transistor M2 is connected to the sensor control line EL, and the drain thereof is connected to one of the electrodes of the capacitor C1 and the gate of the transistor T2. The source of the transistor M1 is connected to the reset line RST1. The other electrode of the capacitor C1 is connected to the readout line RWS1. The drain of the transistor T2 is connected to the power source line VDD, and the source thereof is connected to the output line OUT. The transistor T2 functions as a readout switching element. The transistors M1 and M2 function as protection switching elements.

The configuration of the second sensor pixel circuit 9*b* shown in FIG. 3B is identical to that of the first sensor pixel circuit 9*a*.

Figure 4:
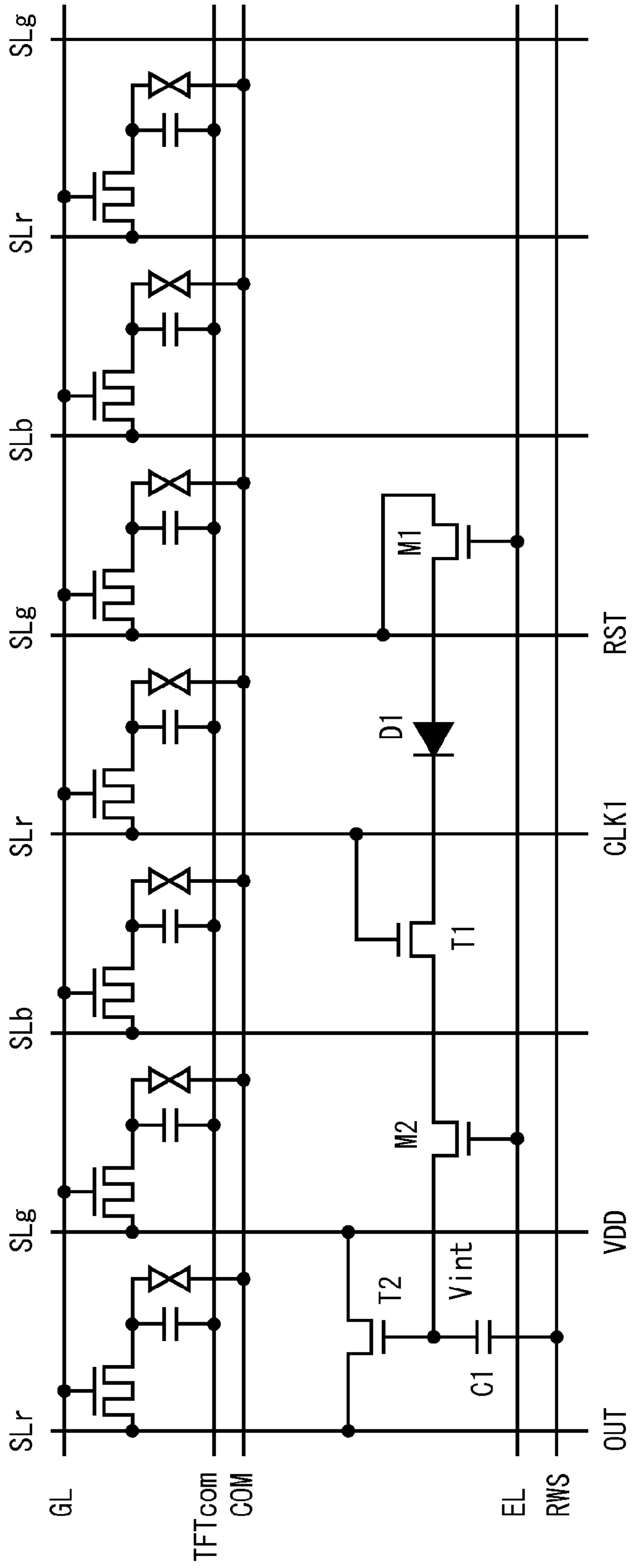
FIG. 4 is a circuit diagram showing an exemplary configuration in the case where the first sensor pixel circuit according to Embodiment 1 is integrated inside a pixel.

FIG. 4 is a circuit diagram showing an exemplary configuration in the case where the first sensor pixel circuit 9*a* is integrated in a pixel. As shown in FIG. 4, the sensor control line EL and the readout line RWS are arranged in parallel with the gate line GL. The output line OUT connected to the source of the transistor T2 in the first sensor pixel circuit 9*a* doubles as the source line SLr connected to the display pixel circuit for red display. The power source line VDD connected to the drain of the transistor T2 doubles as the source line SLg connected to the display pixel circuit 8 for green display. The clock line CLK1 connected to the gate of the transistor T1 doubles as the source line SLr connected to the display pixel circuit 8 for red display. In the display device according to the present embodiment, a sensor driving period during which the resetting and the sensing of the first sensor pixel circuit 9*a* and the second sensor pixel circuit 9*b* are performed is provided once in one frame period. The sensor driving period is provided independently from the display driving period during which the display by the display pixel circuits 8 is carried out. This is because, as described above, a part of the source lines SL for supplying display signals to the display pixel circuits 8 are used for sensor driving as well.

[Operation of Sensor Pixel Circuit]

Figure 5:
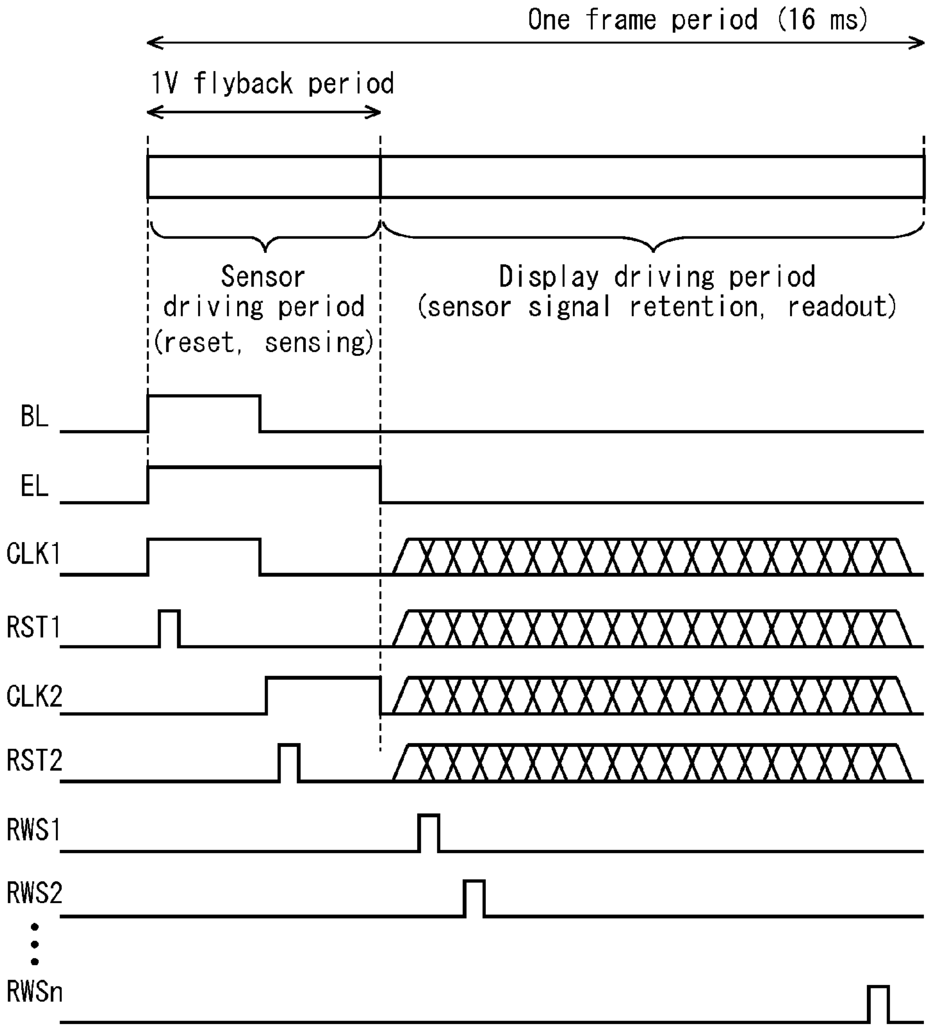
FIG. 5 is a waveform diagram showing signals supplied to the sensor pixel circuits according to Embodiment 1.

FIG. 5 is a waveform diagram showing driving signals of various types supplied to the first sensor pixel circuits 9*a* and the second sensor pixel circuits 9*b*. In the display device according to the present embodiment, a sensor driving period during which the resetting and the sensing of the first sensor pixel circuits 9*a* and the second sensor pixel circuits 9*b* are performed is provided once during one frame period. The sensor driving period is provided independently from the display driving period during which the display by the display pixel circuits 8 is performed. This is because, as described above, a part of the source lines SL for supplying display signals to the display pixel circuits 8 are used for sensor driving as well.

The sensor driving period is preferably provided within a vertical flyback period, or within a period that contains the vertical flyback period, as shown in FIG. 5. In the case where one frame period is 16 ms (milliseconds), the duration of the vertical flyback period is, for example, 2 ms. In the example shown in FIG. 5, the backlight control signal BL rises to a high level in the former half of the sensor driving period, and the resetting and the sensing are carried out with respect to the first sensor pixel circuits 9*a*. On the other hand, in the latter half of the sensor driving period, the backlight control signal BL falls to a low level, and the resetting and the sensing are carried out with respect to the second sensor pixel circuits 9*b*.

During the display driving period, the image display by the display pixel circuits 8 is performed, and at the same time, the retention of sensor signals sensed during the sensor driving period and the sequential readout of the sensor signals according to the readout signals RWS are performed by the first sensor pixel circuits 9*a* and the second sensor pixel circuits 9*b*.

In the example shown in FIG. 5, the sensor control signal EL maintains the high level during the sensor driving period. This causes the transistors M1 and M2 to be in an ON state during the sensor driving period. In the former half of the sensor driving period, first, the clock signal CLK1 supplied to the first sensor pixel circuits 9*a* rises to a high level, and the reset signal RST1 rises to a high level. The rise of the clock signal CLK1 and the reset signal RST1 to the high levels causes the transistor T1 to be turned on, and causes the high-level potential of the reset signal RST1 to be supplied to the anode of the photodiode D1. This causes the potential Vint of the accumulation node to be reset to a potential corresponding to the high level of the reset signal RST1.

Then, in the former half of the sensor driving period, the period from when the reset signal RST1 switches from the high level to the low level until the clock signal CLK1 switches from the high level to the low level is the sensing period (accumulation period) of the first sensor pixel circuits 9*a*. During this sensing period, the incidence of light on the photodiode D1 of the first sensor pixel circuit 9*a* causes the potential Vint of the accumulation node to fall by a degree according to an amount of light incident during a period while the clock signal CLK1 is at the high level, whereby charges are accumulated in the capacitor C1. It should be noted that here, as the backlight 3 is in the ON state, the charges (the ON signal) accumulated in the capacitor C1 here correspond to a sum of a signal component incident on the photodiode D1 and a noise component due to external light and the like.

When the clock signal CLK1 switches from the high level to the low level and the accumulation period ends, the transistor T1 is turned off, and the potential Vint of the accumulation node retains the level upon the end of the accumulation period.

As described above, after the clock signal CLK1 switches from the high level to the low level upon the end of the former half of the sensor driving period, then the clock signal CLK2 supplied to the second sensor pixel circuits 9*b* rises to the high level, and subsequently, the reset signal RST2 also rises to the high level. Thereafter, the second sensor pixel circuits 9*b* perform the resetting and the sensing in the same manner as that of the first sensor pixel circuits 9*a*. It should be noted that, as the backlight 3 is in an OFF state, the charges (the OFF signal) accumulated in the capacitor C1 in the second sensor pixel circuit 9*b* correspond to the noise component of the photodiode D1. After the clock signal CLK2 switches from the high level to the low level at the end of the latter half of the sensor driving period, the potential Vint of the accumulation node at the second sensor pixel circuit 9*b* retains the level at the end of the accumulation period.

Then, during the display driving period, the sensor control signal ET, maintains the low level. This causes the transistors M1 and M2 to be maintained in the OFF state during the display driving period. The clock lines CLK1 and CLK2 double as the source lines SLr for supplying data signals to the display pixel circuits 8 for red display, as described above. Therefore, data signals for performing red pixel display are supplied to the clock signals CLK1 and CLK2, as shown in FIG. 5. Further, the reset lines RST1 and RST2 double as the source lines SLg for supplying data signals to the display pixel circuits 8 for green display. Therefore, data signals for performing green pixel display are supplied to the reset signals RST1 and RST2, as shown in FIG. 5.

During the display driving period, as shown in FIG. 5, the high-level potential for readout is supplied to the readout lines RWS1 to RWSn sequentially. This supply of the high-level potential for readout causes the potential Vint of the accumulation node to rise by (Cqa/Cpa) time the amplitude of the high-level potential (where Cpa represents a value of a capacitance of one sensor pixel circuit as a whole, and Cqa represents a value of a capacitance of the capacitor C1). The transistor T2 forms a source follower amplifying circuit that has, as its load, a transistor (not shown) included in the source driver circuit 6, and drives the output line OUT according to the potential Vint.

In the source driver circuit 6, the sensor signal (OFF signal) output from the output line OUT of the second sensor pixel circuit 9*b* is subtracted from the sensor signal (ON signal) output from the output line OUT of the first sensor pixel circuit 9*a*, whereby a sensor output from which the noise component has been removed can be obtained.

As has been described above, the present embodiment includes the first sensor pixel circuit 9*a* that detects the ON signal and the second sensor pixel circuit 9*b* that detects the OFF signal, and by determining a difference between the ON signal and the OFF signal, obtains a high-precision sensor output from which a noise component has been removed.

Further, in the sensor pixel circuit 9 according to the present embodiment, the clock signal CLK, the reset signal RST, and the constant voltage VDD are supplied via the source lines SL. Therefore, lines that need to be provided as the bus lines for driving the sensor pixel circuit 9 in addition to the bas lines for driving the display pixel circuits 8 are only the sensor control lines ET, and the readout lines RWS. Consequently, it is possible to realize high-precision sensor pixel circuits, while suppressing the addition of bus lines. Further, since the addition of bus lines is suppressed, an advantage that the aperture ratio can be maintained at a high level can be achieved also. With a higher aperture ratio, the backlight 3 may have a lower illuminance, which leads to the reduction of power consumption.

Still further, in the sensor pixel circuit 9 according to the present embodiment, the transistors M1 and M2 are provided, which allows the following advantages to be achieved. First, the transistor M1 has a function of preventing the potential (Vc) on the side of the cathode of the photodiode D1 from rising to higher than the reset level. Further, the transistor M2 maintains the OFF state during the display driving period, thereby having a function of protecting the potential Vint of the accumulation node from potential fluctuations of the clock line CLK (source line SLr) in the display driving period (retention period before readout).

[Embodiment 2]

Hereinafter, Embodiment 2 of the display device of the present invention is explained. The members having the same functions as those of Embodiment 1 are denoted by the same reference numerals as those in Embodiment 1, and detailed explanations of the same are omitted.

[Configuration of Sensor Pixel Circuit]

Figure 6:
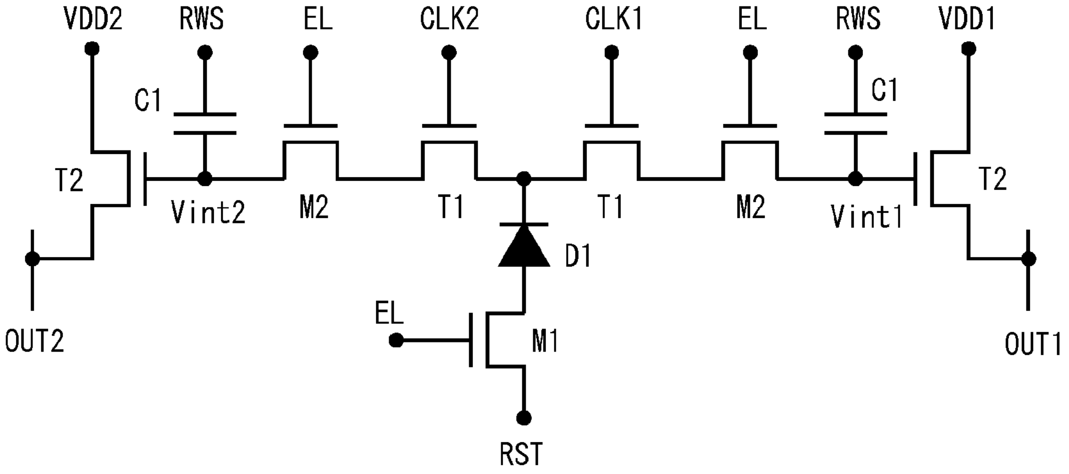
FIG. 6 is a circuit diagram showing a configuration of a sensor pixel circuit according to Embodiment 2.

FIG. 6 is a circuit diagram showing a configuration of a sensor pixel circuit 9 according to Embodiment 2. The sensor pixel circuit 9 shown in FIG. 6 has a configuration in which the first sensor pixel circuit 9*a* shown in FIG. 3A and the second sensor pixel circuit 9*b* shown in FIG. 3B are connected symmetrically in such a manner that the first and second sensor pixel circuits 9*a* and 9*b* share the photodiode D1 and the transistor M1. In the configuration of FIG. 6, the photodiode D1, the transistor M1, and circuit elements in the right half correspond to the first sensor pixel circuit 9*a*, and the photodiode D1, the transistor M1, and circuit elements in the left half correspond to the second sensor pixel circuit 9*b*.

Figure 7:
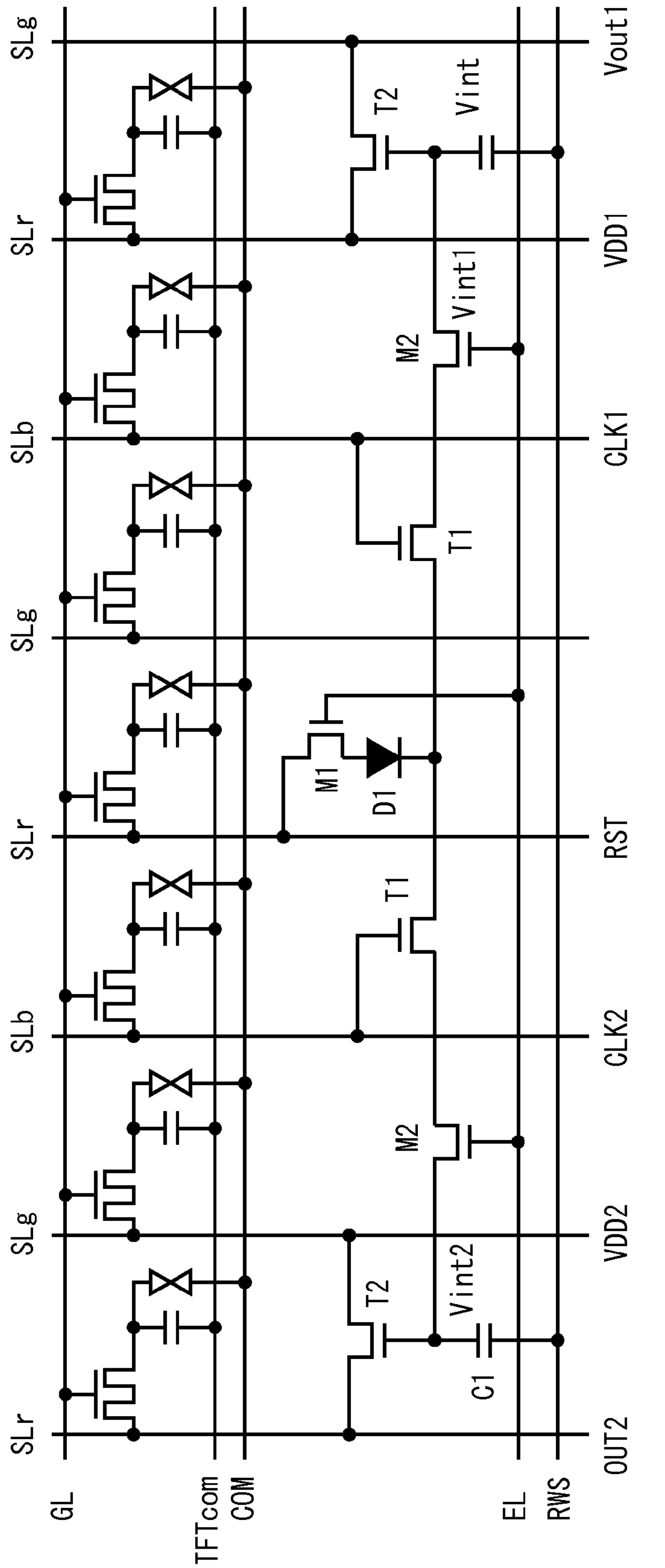
FIG. 7 is a circuit diagram showing an exemplary configuration in the case where the sensor pixel circuit according to Embodiment 2 is integrated inside a pixel.

FIG. 7 is a circuit diagram in the case where the sensor pixel circuit 9 shown in FIG. 6 is integrated in a pixel. As shown in FIG. 7, the sensor control line EL and the readout line RWS are arranged in parallel with the gate line GL in the case of the sensor pixel circuit 9 according to Embodiment 2 as well. The output line OUT1 connected to the source of the transistor T2 of the first sensor pixel circuit 9*a* doubles as the source line SLg connected to the display pixel circuit 8 for green display. The power source line VDD1 connected to the drain of the transistor T2 doubles as the source line SLr connected to the display pixel circuit 8 for red display. The clock line CLK1 connected to the gate of the transistor T1 doubles as the source line SLb connected to the display pixel circuit 8 for blue display. The reset line RST connected to the source of the transistor M1 doubles as the source line SLr connected to the display pixel circuit 8 for red display.

The output line OUT2 connected to the source of the transistor T2 of the second sensor pixel circuit 9*b* doubles as the source line SLr connected to the display pixel circuit 8 for red display. The power source line VDD2 connected to the drain of the transistor T2 doubles as the source line SLg connected to the display pixel circuit 8 for green display. The clock line CLK1 connected to the gate of the transistor T1 doubles as the source line SLb connected to the display pixel circuit 8 for blue display.

[Operation of Sensor Pixel Circuit]

Figure 8:
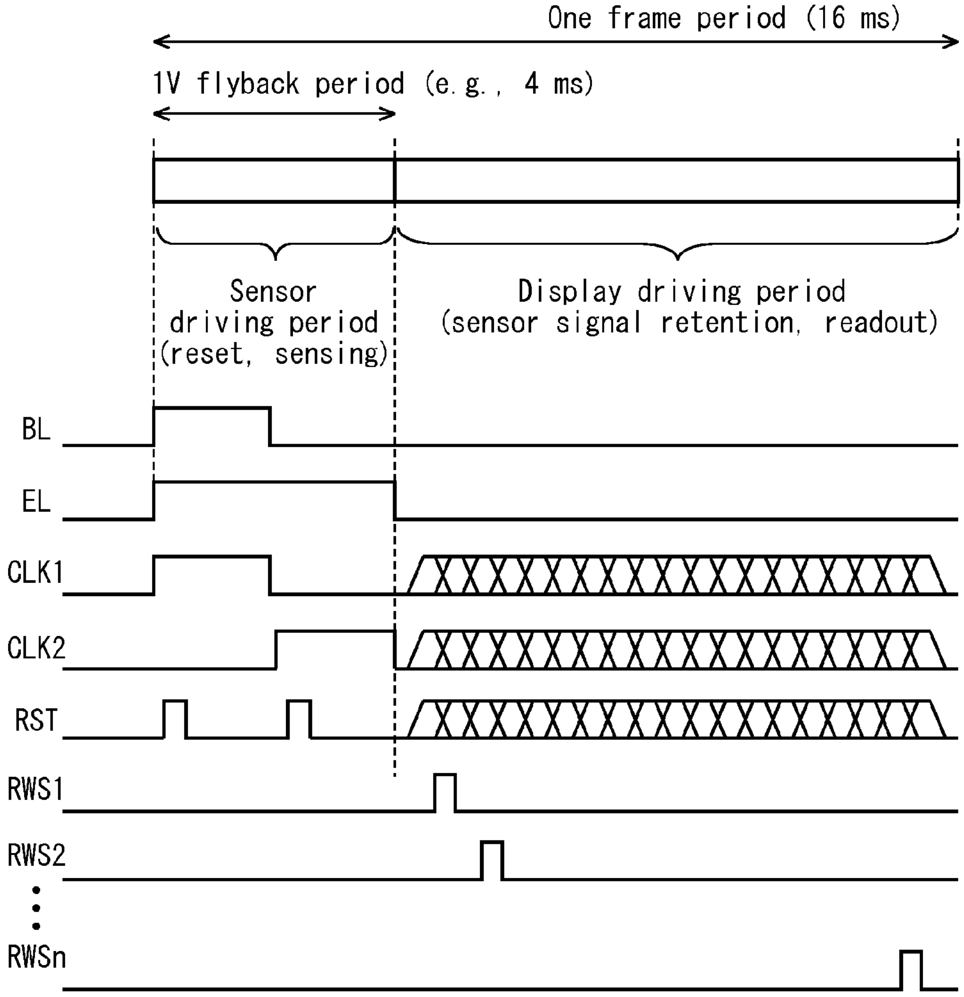
FIG. 8 is a waveform diagram showing signals supplied to a sensor pixel circuit according to Embodiment 2.

FIG. 8 is a waveform diagram showing driving signals of various types supplied to the first sensor pixel circuits 9*a* and the second sensor pixel circuits 9*b*. As shown in FIG. 8, the timings of the driving signals supplied to the display device according to the present embodiment are basically identical to those of Embodiment 1.

In the former half of the sensor driving period, when the reset signal RST rises to the high level, the clock signal CLK1 is at the high level, and the clock signal CLK2 is at the low level. Therefore, the potential Vint1 of the accumulation node of the first sensor pixel circuit 9*a* is reset. Thereafter, while the clock signal CLK1 is being at the high level, the potential Vint1 of the accumulation node of the first sensor pixel circuit 9*a* falls by a degree according to an amount of light that has been incident on the photodiode D1 during this period. It should be noted that, as the backlight 3 has been in the ON state during this period, the charges (the ON signal) accumulated in the capacitor C1 here correspond to a sum of a signal component incident on the photodiode D1 and a noise component due to external light and the like.

In the latter half of the sensor driving period, when the reset signal RST rises to the high level again, the clock signal CLK2 is at the high level and the clock signal CLK1 is at the low level. Therefore, the potential Vint2 of the accumulation node of the second sensor pixel circuit 9*b* is reset. Thereafter, while the clock signal CLK2 is being at the high level, the potential Vint2 of the accumulation node of the second sensor pixel circuit 9*b* falls by a degree according to an amount of light that has been incident on the photodiode D1 during this period. It should be noted that, as the backlight 3 has been in the OFF state during this period, the charges (the OFF signal) accumulated in the capacitor C1 here correspond to the noise component of the photodiode D1.

During the display driving period, the high-level potential for readout is supplied to the readout lines RWS1 to RWSn sequentially, whereby the ON signal is obtained from the output line OUT1 of the first sensor pixel circuit 9*a* and the OFF signal is obtained from the output line OUT2 of the second sensor pixel circuit 9*b*. Then, by determining a difference between the ON signal and the OFF signal in the source driver circuit 6, a high-precision sensor output from which the noise component has been removed can be obtained.

Further, in the sensor pixel circuit 9 according to the present embodiment as well, the clock signal CLK, the reset signal RST, and the constant voltage VDD are supplied via the source lines SL. Therefore, lines that need to be provided as the bus lines for driving the sensor pixel circuit 9 in addition to the bas lines for driving the display pixel circuits 8 are only the sensor control lines EL and the readout lines RWS. Consequently, it is possible to realize high-precision sensor pixel circuits, while suppressing the addition of bus lines. Further, since the addition of bus lines is suppressed, an advantage that the aperture ratio can be maintained at a high level can be achieved also. With a higher aperture ratio, the backlight 3 may have a lower illuminance, which leads to the reduction of power consumption.

Still further, in the sensor pixel circuit 9 according to the present embodiment, the transistors M1 and M2 are provided, which allows the following advantages to be achieved. First, the transistor M1 has a function of preventing the potential (Vc) on the side of the cathode of the photodiode D1 from rising to higher than the reset level. Further, the transistor M2 has a function of maintaining the OFF state during the display driving period, thereby protecting the potential Vint of the accumulation node from potential fluctuations of the clock line CLK (source line SLr) in the display driving period (retention period before readout).

Still further, in the sensor pixel circuit 9 according to the present embodiment, the first pixel circuit 9*a* and the second pixel circuit 9*b* share one photodiode D1, whereby there are no longer influences of variation of sensitivity characteristics of the photodiode. Therefore, the difference between an amount of light during the backlight-on period (the ON signal) and an amount of light during the backlight-off period (the OFF signal) can be determined precisely. Further, the number of the photodiodes can be reduced, whereby the aperture ratio is increased, and the sensitivity of the sensor pixel circuits can be increased.

[Embodiment 3]

Hereinafter, Embodiment 3 of the display device of the present invention is explained. The members having the same functions as those of the above-described embodiments are denoted by the same reference numerals as those in the above-described embodiments, and detailed explanations of the same are omitted.

[Configuration of Sensor Pixel Circuit]

Figure 9:
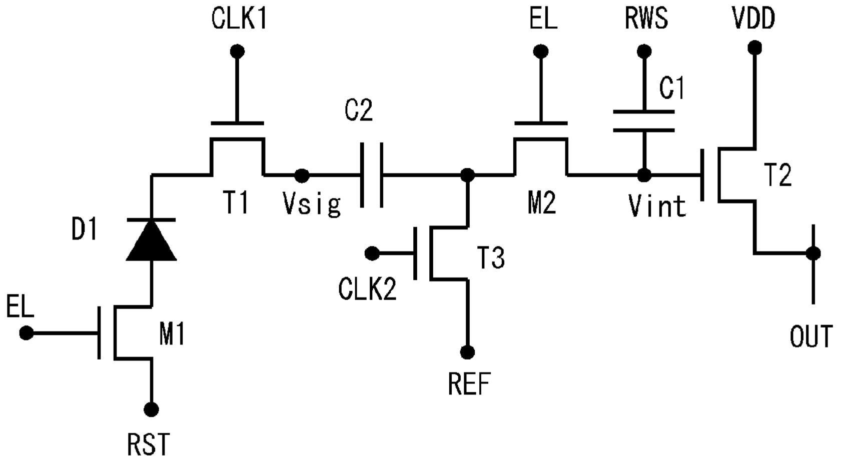
FIG. 9 is a circuit diagram showing a configuration of a sensor pixel circuit according to Embodiment 3.

FIG. 9 is a circuit diagram showing a configuration of a sensor pixel circuit 9 according to Embodiment 3. The sensor pixel circuit 9 shown in FIG. 9 has a configuration that includes a photodiode D1, transistors T1, T2, T3, M1, and M2, and capacitors C1 and C2. It should be noted that the sensor pixel circuits 9 according to the present embodiment are not distinguished as the first sensor pixel circuits 9*a* or the second sensor pixel circuits 9*b*, and all of the sensor pixel circuits 9 provided in the pixel region 4 have the same configuration. Further, from the sensor pixel circuit 9 according to the present embodiment, a sensor output corresponding to a difference between an ON signal and an OFF signal, explained above regarding Embodiment 1, is output via the output line OUT.

The transistors T1, T2, T3, M1, and M2 are, for example, N-type TFTs (thin film transistors). The anode of the photodiode D1 is connected to the drain of the transistor M1, and the cathode thereof is connected to the source of the transistor T1. The gate of the transistor T1 is connected to the clock line CLK1, and the drain thereof is connected to one of the electrodes of the capacitor C2. The other electrode of the capacitor C2 is connected to the drain of the transistor T3. The gate of the transistor T3 is connected to the clock line CLK2, and the source thereof is connected to the constant voltage line REF. The gate of the transistor M2 is connected to the sensor control line EL, and the source thereof is connected to the other electrode of the capacitor C2. The drain of the transistor M2 is connected to one of the electrodes of the capacitor C1. The other electrode of the capacitor C1 is connected to the readout line RWS. The drain of the transistor T2 is connected to the power source line VDD, and the source thereof is connected to the output line OUT.

Figure 10:
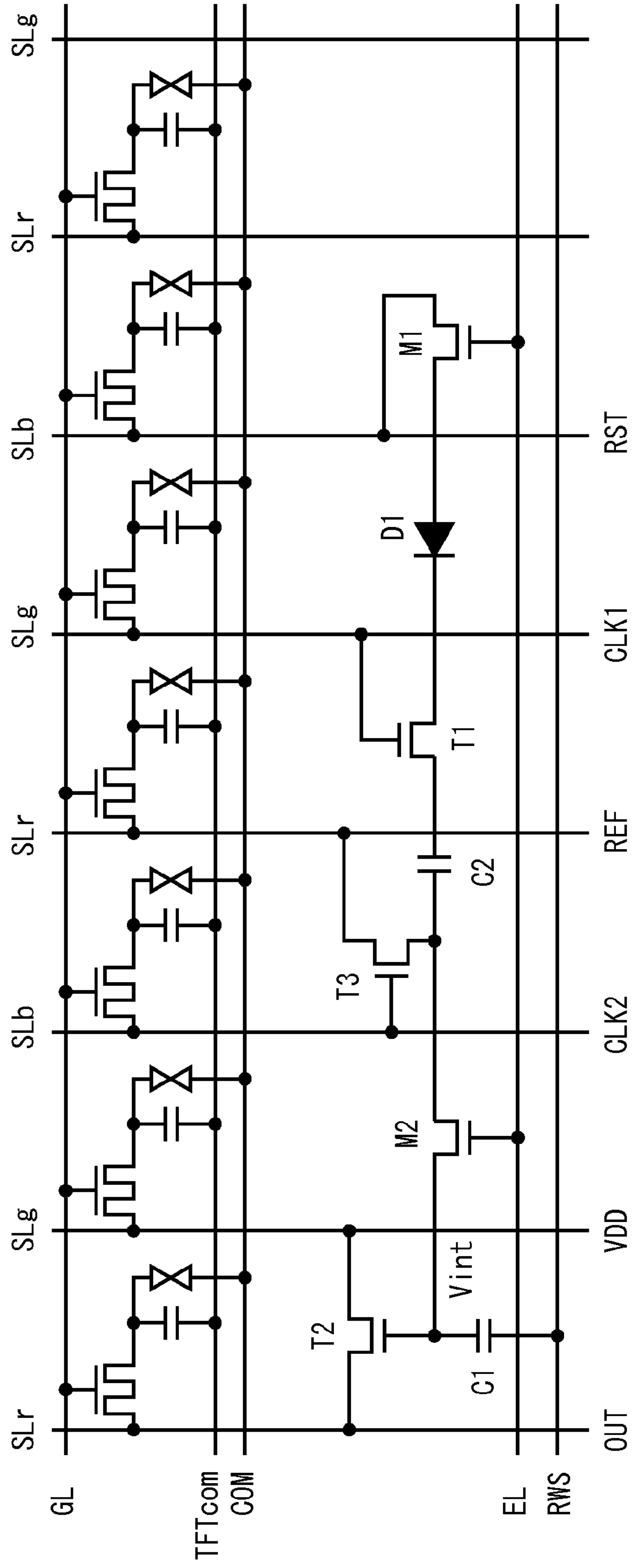
FIG. 10 is a circuit diagram showing an exemplary configuration in the case where the sensor pixel circuit according to Embodiment 3 is integrated in a pixel.

FIG. 10 is a circuit diagram in the case where the sensor pixel circuit 9 shown in FIG. 9 is integrated in a pixel. As shown in FIG. 10, in the case of the sensor pixel circuit 9 according to Embodiment 3 as well, the sensor control line EL and the readout line RWS are arranged in parallel with the gate line GL. The output line OUT connected to the source of the transistor T2 doubles as the source line SLr connected to the display pixel circuit 8 for red display. The power source line VDD connected to the drain of the transistor T2 doubles as the source line SLg connected to the display pixel circuit 8 for green display. The clock line CLK1 connected to the gate of the transistor T1 doubles as the source line SLg connected to the display pixel circuit 8 for green display. The reset line RST connected to the source of the transistor M1 doubles as the source line SLb connected to the display pixel circuit 8 for blue display. The constant voltage line REF connected to the source of the transistor T3 doubles as the source line SLr connected to the display pixel circuit 8 for red display. The clock line CLK2 connected to the gate of the transistor T3 doubles as the source line SLb connected to the display pixel circuit 8 for blue display.

[Operation of Sensor Pixel Circuit]

Figure 11:
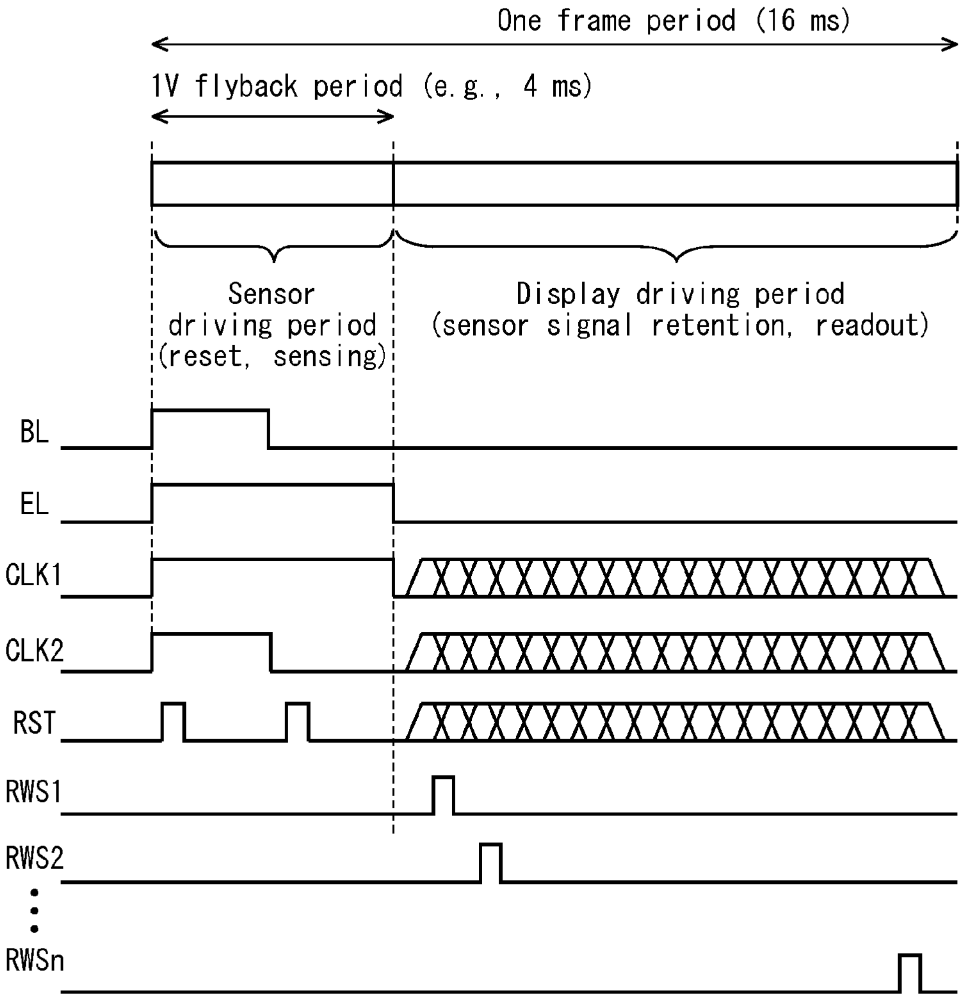
FIG. 11 is a waveform diagram showing a signal supplied to the sensor pixel circuit according to Embodiment 3.

FIG. 11 is a waveform diagram showing driving signals of various types supplied to the sensor pixel circuits 9.

In FIG. 11, "BL" represents an illuminance of the backlight 3.

During the sensor driving period, when the reset signal RST rises to the high level at the first time, the clock signals CLK1 and CLK2 are at the high levels, and the readout signal RWS is at the low level. Here, the transistors T1 and T3 are in the ON state. Therefore, an electric current (forward current of the photodiode D1) flows from the reset line RST via the photodiode D1 and the transistor T1 to the node Vsig, whereby the potential of the node Vsig is reset to a predetermined level.

After the reset signal RST switches to the low level, the clock signals CLK1 and CLK2 are maintained at the high levels, and the readout signal RWS is maintained at the low level. Here, the transistors T1 and T3 are in the ON state. When light is incident on the photodiode D1 in this state, an electric current flows from the node Vsig via the transistor T1 and the photodiode D1 to the reset line RST, and charges are drawn out of the node Vsig. Therefore, the potential Vsig falls by a degree according to an amount of light incident during a period while the clock signal CLK2 is at the high level (during a period while the backlight 3 is in the ON state), whereby charges Qon are accumulated in the capacitor C2. Here, the charges Qon (the ON signal) accumulated in the capacitor C2 correspond to a sum of a photoelectric current component of the photodiode D1 and a noise component of the photodiode D1.

Here, the node Vsig has the following potential:

$$Vsig=Vrst\_h-Qon/C2$$

where Vrst_h represents a high-level potential of the reset signal RST, and Qon represents a value of an integral of the ON current (Ion) flowing through the photodiode D1. It should be noted that here the potential of the accumulation node Vint is equal to the reference voltage Vref supplied from the constant voltage line REF.

Next, during the sensor driving period, after the clock signal CLK2 switches to the low level, the reset signal RST rises to the high level again. Here, the clock signal CLK1 is at the high level. The readout signal RWS also maintains the low level. This causes the transistor T1 to be turned on, and causes the transistors T3 and T2 to be turned off. The turning-on of the transistor T1 and the rise of the reset signal RST to the high level cause the potential of the node Vsig to become equal to the high-level potential of the reset signal RST. Further, the charges Qon accumulated in the capacitor C2 are transferred to the accumulation node Vint, and are accumulated in the capacitors C1 and C2.

Here, the accumulation node Vint has the following potential:

$$Vint=Vref+Qon/(C1+C2)$$

Next, after the reset signal RST switches to the low level, during the OFF signal accumulation period, the clock signal CLK1 is at the high level, and the clock signal CLK2 is at the low level. When light is incident on the photodiode D1 in this state, an OFF current (Ioff) flows from the node Vsig via the transistor T1 and the photodiode D1 to the reset line RST, and charges are drawn out of the node Vsig. Therefore, the potential Vsig falls by a degree according to an amount of light incident during a period while the clock signal CLK1 is being at the high level after the reset signal RST switches to the low level, and charges Qoff are accumulated in the capacitor C2. Here, since the backlight 3 is in the OFF state, the charges Qoff (the OFF signal) accumulated in the capacitor C2 corresponds to a noise component of the photodiode D1.

Here, the node Vsig has the following potential:

$$Vsig=Vrst\_h-Qoff/(C1//C2)$$

Qoff represents an integral of the OFF current (Ioff) of the photodiode D1. C1//C2 is a synthetic capacitance in the case where the capacitors C1 and C2 are connected in series. Further, the accumulation node Vint has the following potential:

$$Vint=Vref+Qon/(C1+C2)-Qff/C1$$

As is clear from this expression, during the OFF signal accumulation period, the potential of the accumulation node Vint has a value corresponding to a difference between the ON signal and the OFF signal.

Then, during the readout period after the sensor driving period ends and the display driving period starts, the clock signals CLK1 and CLK2 and the reset signal RST are at the low levels, and the readout signals RWS from the readout lines rise sequentially one by one to the high level for readout. Here, the transistors T1 and T3 are in the OFF state. Here, the potential Vint rises by (C1/Cpa) time the amount of rise of the readout signal RWS (where Cpa represents a value of a capacitance of one sensor pixel circuit as a whole). The transistor T2 forms a source follower amplifying circuit that has, as its load, a transistor (not shown) included in the source driver circuit 6, and drives the output line OUT according to the potential Vint.

As has been described above, according to the present embodiment, a difference between the ON signal and the OFF signal is determined inside one sensor pixel circuit 9, and is output as a sensor output from the output line OUT. Thus, a high-precision sensor output from which a noise component has been removed can be obtained.

Further, in the sensor pixel circuit 9 according to the present embodiment, the clock signal CLK, the reset signal RST, and the constant voltage VDD are supplied via the source lines SL. Therefore, lines that need to be provided as the bus lines for driving the sensor pixel circuit 9 in addition to the bas lines for driving the display pixel circuits 8 are only the sensor control lines ET, and the readout lines RWS. Consequently, it is possible to realize high-precision sensor pixel circuits, while suppressing the addition of bus lines. Further, since the addition of bus lines is suppressed, an advantage that the aperture ratio can be maintained at a high level can be achieved also. With a higher aperture ratio, the backlight 3 may have a lower illuminance, which leads to the reduction of power consumption.

Still further, in the sensor pixel circuit 9 according to the present embodiment, the transistors M1 and M2 are provided, which allows the following advantages to be achieved. First, the transistor M1 has a function of preventing the potential (Vc) on the side of the cathode of the photodiode D1 from rising to higher than the reset level. Further, the transistor M2 has a function of maintaining the OFF state during the display driving period, thereby protecting the potential Vint of the accumulation node from potential fluctuations of the clock line CLK (source line SLr) in the display driving period (retention period before readout).

[Embodiment 4]

Hereinafter, Embodiment 4 of the display device of the present invention is explained. The members having the same functions as those of the above-described embodiments are denoted by the same reference numerals as those in the above-described embodiments, and detailed explanations of the same are omitted.

[Configuration of Sensor Pixel Circuit]

Figure 12A:
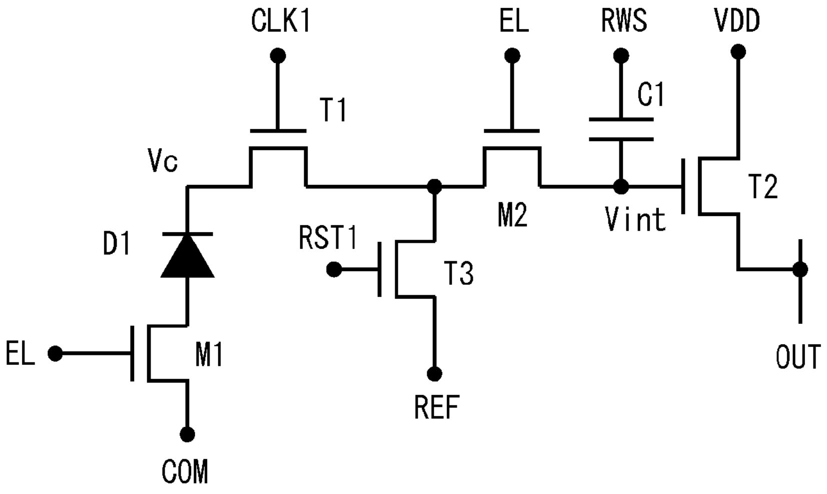
FIG. 12A is a circuit diagram showing a configuration of the first sensor pixel circuit according to Embodiment 4.
Figure 12B:
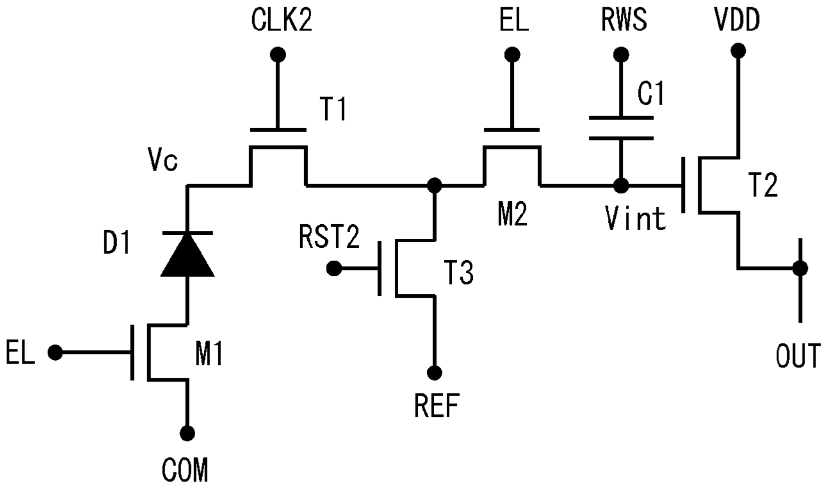
FIG. 12B is a circuit diagram showing a configuration of a second sensor pixel circuit according to Embodiment 4.

FIGS. 12A and 12B are circuit diagrams showing configurations of a first sensor pixel circuit 9*a* and a second sensor pixel circuit 9*b* according to Embodiment 4. The first sensor pixel circuit 9*a* shown in FIG. 12A includes a photodiode D1, transistors T1, T2, T3, M1, and M2, as well as a capacitor C1. The second sensor pixel circuit 9*b* has the same circuit configuration as that of the first sensor pixel circuit 9*a*.

The transistors T1, T2,T3, M1, and M2 are, for example, N-type TFTs (thin film transistors). In the first sensor pixel circuit 9*a*, the anode of the photodiode D1 is connected to the drain of the transistor M1, and the cathode thereof is connected to the source of the transistor T1. The gate of the transistor T1 is connected to the clock line CLK1, and the drain thereof is connected to the drain of the transistor T3. The gate of the transistor T3 is connected to the reset line RST1, and the source thereof is connected to the constant voltage line REF. The gate of the transistor M1 is connected to the sensor control line EL, and the source thereof is connected to the constant voltage line COM. The gate of the transistor M2 is connected to the sensor control line EL, and the source thereof is connected to the drain of the transistor T3. One of the electrodes of the capacitor C1 is connected to the gate of the transistor T2, and the other electrode of the capacitor C1 is connected to the readout line RWS. The drain of the transistor T2 is connected to the power source line VDD, and the source thereof is connected to the output line OUT.

The source driver circuit 6 according to the present embodiment includes a difference circuit (not shown) that determines a difference between an output signal of the first sensor pixel circuit 9*a* and an output signal of the second sensor pixel circuit 9*b*. The source driver circuit 6 amplifies the light amount difference determined by the difference circuit, and outputs the amplified signal as a sensor output Sout to outside the display panel 2. The sensor output Sout is subjected to appropriate processing as required by a signal processing circuit 20 provided outside the display panel. 2.

Figure 13:
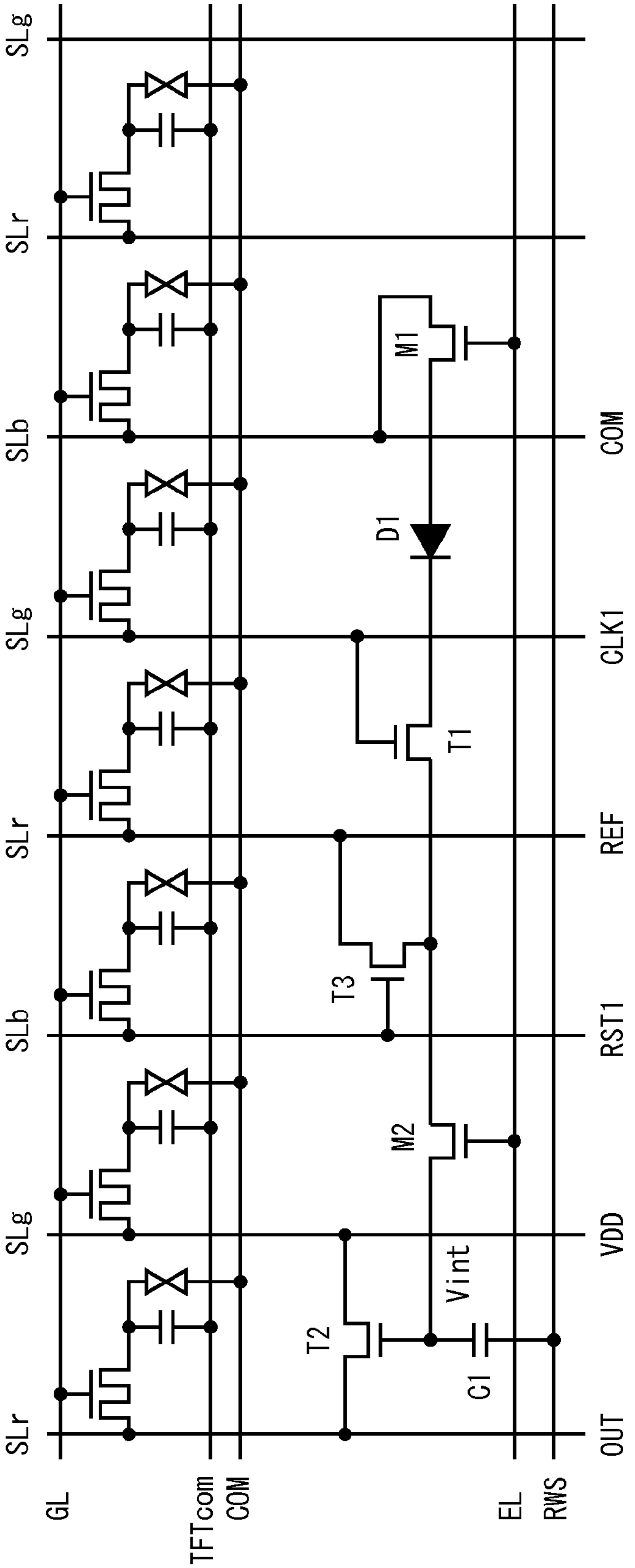
FIG. 13 is a circuit diagram showing an exemplary configuration in the case where the sensor pixel circuit according to Embodiment 4 is integrated inside a pixel.

FIG. 13 is a circuit diagram in the case where the sensor pixel circuits 9 shown in FIGS. 12A and 12B are integrated in a pixel. As shown in FIG. 13, in the case of the sensor pixel circuit 9 according to Embodiment 4 as well, the sensor control line EL and the readout line RWS are arranged in parallel with the gate line GL. The output line OUT connected to the source of the transistor T2 doubles as the source line SLr connected to the display pixel circuit 8 for red display. The power source line VDD connected to the drain of the transistor T2 doubles as the source line SLg connected to the display pixel circuit 8 for green display. The clock line CLK1 connected to the gate of the transistor T1 doubles as the source line SLg connected to the display pixel circuit 8 for green display. The reset line RST connected to the gate of the transistor T3 doubles as the source line SLb connected to the display pixel circuit 8 for blue display. The constant voltage line REF connected to the source of the transistor T3 doubles as the source line SLr connected to the display pixel circuit 8 for red display. The constant voltage line COM connected to the source of the transistor M1 doubles as the source line SLb connected to the display pixel circuit 8 for blue display.

[Operation of Sensor Pixel Circuit]

Figure 14:
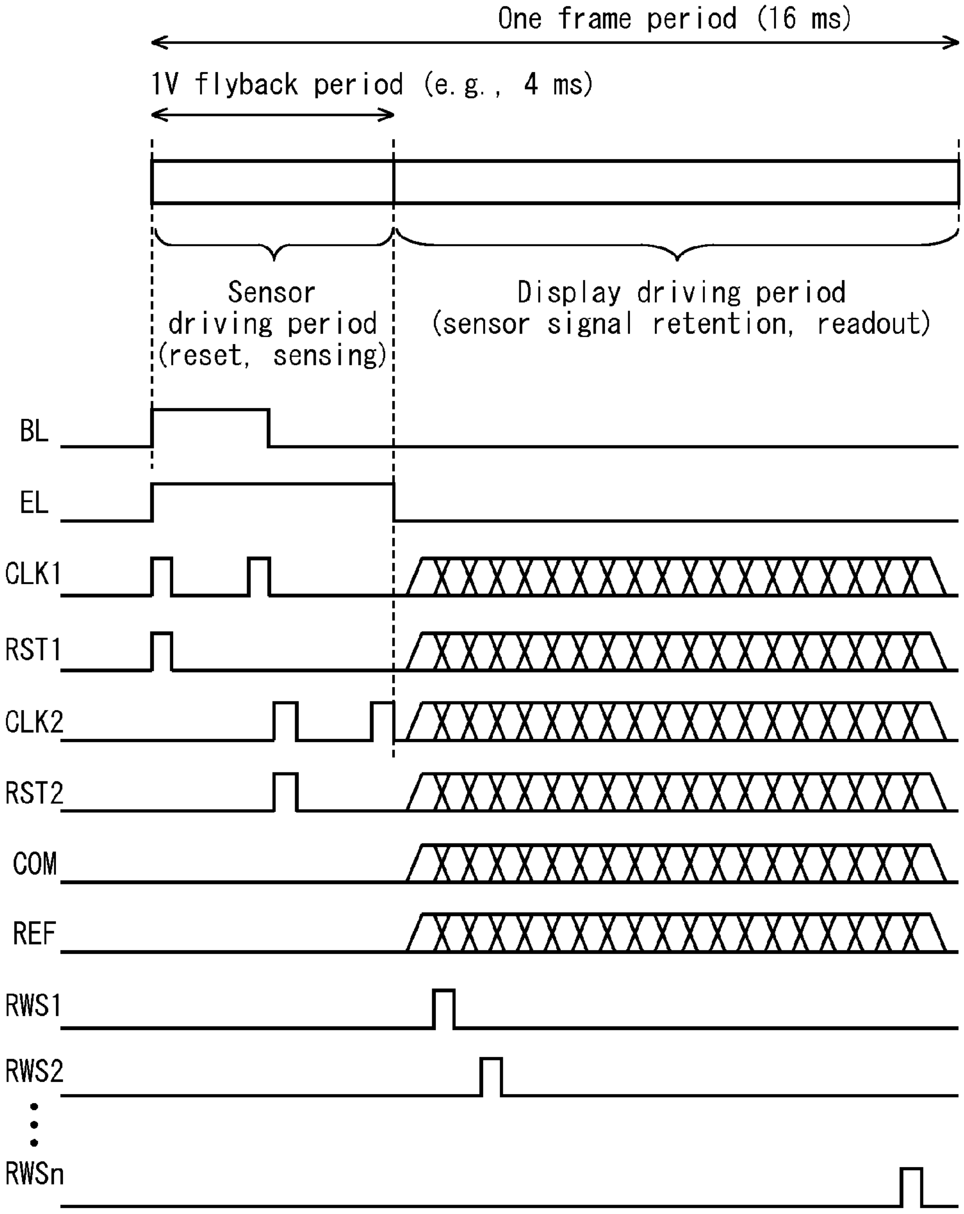
FIG. 14 is a waveform diagram showing signals supplied to the sensor pixel circuits according to Embodiment 4.

FIG. 14 is a waveform diagram showing driving signals supplied to the sensor pixel circuits 9.

In the example shown in FIG. 14, the backlight 3 is turned on once, for a predetermined period of time, during one frame period, and is turned off during the other period. More specifically, the backlight 3 is in the ON state during the former half of the sensor driving period, and is in the OFF state during the latter half of the period. At the beginning of the sensor driving period, all of the first sensor pixel circuits 9*a* are reset, and at the beginning of the latter half of the sensor driving period, all of the second sensor pixel circuits 9*b* are reset.

The first sensor pixel circuits 9*a* detect light that is incident during the former half of the sensor driving period (the backlight-on period of the backlight 3). The second sensor pixel circuits 9*b* detect light that is incident during the latter half of the sensor driving period (the backlight-off period of the backlight 3). The readout from the first sensor pixel circuits 9*a* and the readout from the second sensor pixel circuits 9*b* are carried out line-sequentially, after the end of the sensor driving period, within the display driving period.

As shown in FIG. 14, the potentials of the odd-number-th clock lines CLK1 to CLKn−1 rise to the high level twice in one frame period, for a predetermined time each, in the former half of the sensor driving period. The potentials of the even-number-th clock lines CLK2 to CLKn rise to the high level twice in one frame period, for a predetermined time each, in the latter half of the sensor driving period. The potentials of the odd-number-th reset lines RST1 to RSTn−1 rise to the high level once in one frame period, for a predetermined time at the beginning of the sensor driving period. The potentials of the even-number-th reset lines RST2 to RSTn rise to the high level once in one frame period, for a predetermined time, at the beginning of the latter half of the sensor driving period. The readout lines RWS1 to RWSn rise to the high level sequentially, for a predetermined time each, during the display driving period.

It should be noted that the following is satisfied:

$$Vint-Vsig>Vclk-Vsig-Vth$$

where Vclk represents the high-level potential of the clock lines CLK, Vsig represents the potential of the node Vc, and Vth represents a threshold voltage of the transistor T1.

The rise of the clock signal CLK and the reset signal RST to the high levels causes the transistors T1 and T3 both to be turned on. The turning-on of the transistor T3 causes the potential Vint of the accumulation node Vint to be substantially equal to the reference voltage Vref (0 V here) of the constant voltage line REF. The high-level potential of the clock signal CLK is set so as to allow the transistor T1 to operate in a saturation region.

When the reset signal RST switches from the high level to the low level and the reset period ends, the accumulation period starts. During the accumulation period, all of the clock signal CLK, the reset signal RST, and the readout signal RWS are maintained at the low levels. During the accumulation period, the transistors T1 and T3 are in the OFF state. When light is incident on the photodiode D1 in this state, an electric current Ipd according to the incident light flows into the photodiode D1, and charges Qsig are drawn out of the node Vc. As a result, the potential Vsig of the node Vc falls by a degree according to the charges Qsig thus drawn out. It should be noted that as the transistors T1 and T3 are in the OFF state during the accumulation period, the potential Vint of the accumulation node Vint is maintained at the potential (Vref) during the reset period.

Next, when the clock signal CLK again rises to the high level at the end of the accumulation period, the transistor T1 is turned on. This causes charges correspond to the charges Qsig drawn out of the node Vc move from the accumulation node Vint to the node Vc. This causes the potential (Vint) of the accumulation node Vint to fall by ΔVint according to the amount of these charges Qsig. Therefore, the following is satisfied:

$$\begin{aligned} Vint &= Vref - \Delta Vint \\ &= Vref - Qsig/Cint \\ &= Vref - Ipd \cdot t/Cint \end{aligned}$$

where Cint represents a load capacitance of the accumulation node Vint, and t represents a duration of the accumulation period.

As a result, according to the present embodiment, the accumulation node of the first sensor pixel circuit 9*a* has the following potential Vint_on:

$$Vint\_on=Vref-wIpd\_on \cdot t/Cint$$

where Ipd_on represents a value of a photoelectric current flowing through the photodiode D1 during the accumulation period in the backlight-on state of the backlight 3 (the accumulation period in the former half of the sensor driving period).

In the latter half of the sensor driving period, the accumulation node of the second sensor pixel circuit 9*b* has the following potential Vint_off:

$$Vint\_off=Vref-Ipd\_off \cdot t/Cint$$

where Ipd_off represents a value of a photoelectric current flowing through the photodiode D1 during the accumulation period in the backlight-off state of the backlight 3 (the accumulation period in the latter half of the sensor driving period).

As described above, during the readout period, a sensor signal corresponding to an amount of light that has been incident during the detection period while the backlight 3 is in the ON state, and a sensor signal corresponding to an amount of light that has been incident during the detection period while the backlight 3 is in the OFF state are read out of the first sensor pixel circuit 9*a* and the second sensor pixel circuit 9*b*, respectively. The difference circuit included in the source driver circuit 6 determines a difference between the output signal of the first sensor pixel circuit 9*a* and the output signal of the second sensor pixel circuit 9*b*, whereby a difference between the amount of light while the backlight is in the ON state and the amount of light while the backlight is in the OFF state can be determined.

The output signal from the second sensor pixel circuit 9*b*, that is, the sensor signal corresponding to the amount of light that has been incident during the detection period while the backlight 3 is in the OFF state contains only the noise component attributing to ambient environments. Therefore, the output signal from the second sensor pixel circuit 9*b* is subtracted from the output signal from the first sensor pixel circuit 9*a* in the difference circuit of the source driver circuit 6, whereby a high-precision sensor output from which the noise component has been removed can be obtained.

As has been described above, according to the present embodiment, the ON signal is determined in the first sensor pixel circuit 9*a*, and the OFF signal is determined in the second sensor pixel circuit 9*b*, and further, a difference between the ON signal and the OFF signal is determined in the source driver circuit 6. Consequently, a high-precision sensor output from which a noise component has been removed can be obtained.

Further, in the sensor pixel circuit 9 according to the present embodiment, the clock signal CLK, the reset signal RST, and the constant voltages VDD, REF, and COM are supplied via the source lines SL. Therefore, lines that need to be provided as the bus lines for driving the sensor pixel circuit 9 in addition to the bas lines for driving the display pixel circuits 8 are only the sensor control lines EL and the readout lines RWS. Consequently, it is possible to realize high-precision sensor pixel circuits, while suppressing the addition of bus lines. Further, since the addition of bus lines is suppressed, an advantage that the aperture ratio can be maintained at a high level can be achieved also.

Still further, in the sensor pixel circuit 9 according to the present embodiment, the transistors M1 and M2 are provided, which allows the following advantages to be achieved. First, the transistor M1 has a function of preventing the potential (Vc) on the side of the cathode of the photodiode D1 from rising to higher than the reset level. Further, the transistor M2 has a function of maintaining the OFF state during the display driving period, thereby protecting the potential Vint of the accumulation node from potential fluctuations of the clock line CLK (source line SLr) in the display driving period (retention period before readout).

[Embodiment 5]

Hereinafter, Embodiment 5 of the display device of the present invention is explained. The members having the same functions as those of the above-described embodiments are denoted by the same reference numerals as those in the above-described embodiments, and detailed explanations of the same are omitted.

[Configuration of Sensor Pixel Circuit]

Figure 15:
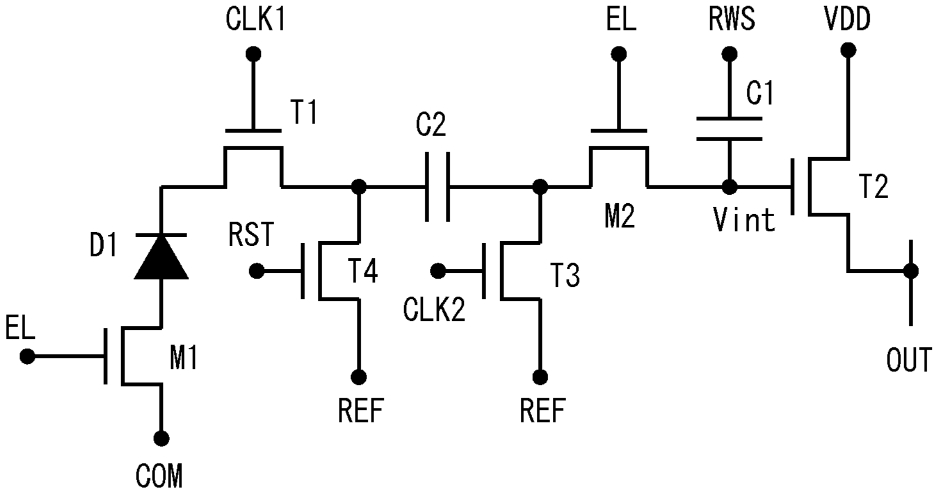
FIG. 15 is a circuit diagram showing a configuration of a sensor pixel circuit according to Embodiment 5.

FIG. 15 is a circuit diagram showing a configuration of the sensor pixel circuit 9 according to Embodiment 5. The sensor pixel circuit 9 shown in FIG. 15 has a configuration obtained by adding a transistor T4 to the sensor pixel circuit 9 according to Embodiment 3. The transistor T4 is, for example, an N-type TFT (thin film transistor).

The gate of the transistor T4 is connected to the reset line RST. It should be noted that in the present embodiment, the source of the transistor M1 is connected, not to the reset line RST, but to the constant voltage line COM. The drain of the transistor T4 is connected to between the transistor T1 and the capacitor C2.

Figure 16:
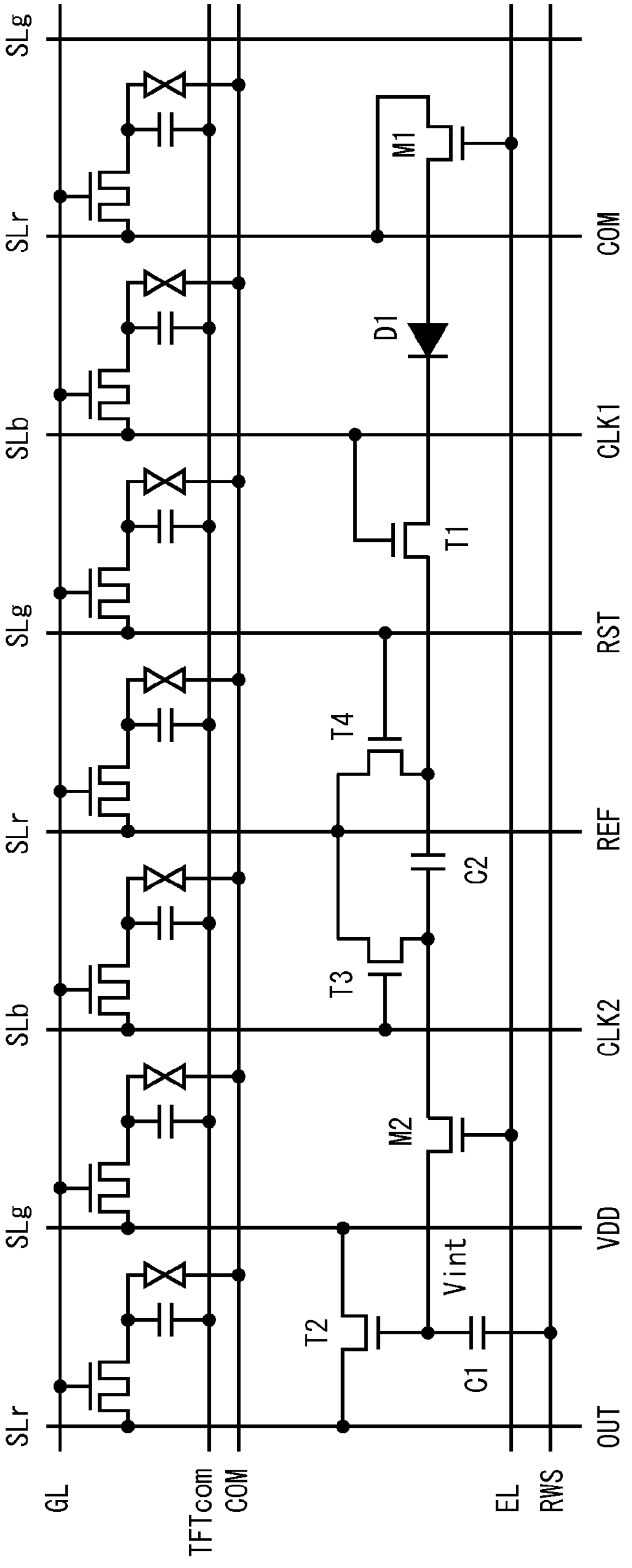
FIG. 16 is a circuit diagram showing an exemplary configuration in the case where the sensor pixel circuit according to Embodiment 5 is integrated inside a pixel.

FIG. 16 is a circuit diagram in the case where the sensor pixel circuit 9 shown in FIG. 15 is integrated in a pixel. As shown in FIG. 16, in the case of the sensor pixel circuit 9 according to Embodiment 5 as well, the sensor control line EL and the readout line RWS are arranged in parallel with the gate line GL. The output line OUT connected to the source of the transistor T2 doubles as the source line SLr connected to the display pixel circuit 8 for red display. The power source line VDD connected to the drain of the transistor T2 doubles as the source line SLg connected to the display pixel circuit 8 for green display. The clock line CLK1 connected to the gate of the transistor T1 doubles as the source line SLb connected to the display pixel circuit 8 for blue display. The clock line CLK2 connected to the gate of the transistor T3 doubles as the source line SLb connected to the display pixel circuit 8 for blue display. The constant voltage line REF connected to the source of the transistor T3 doubles as the source line SLr connected to the display pixel circuit 8 for red display. The constant voltage line COM connected to the source of the transistor M1 doubles as the source line SLr connected to the display pixel circuit 8 for red display.

[Operation of Sensor Pixel Circuit]

Figure 17:
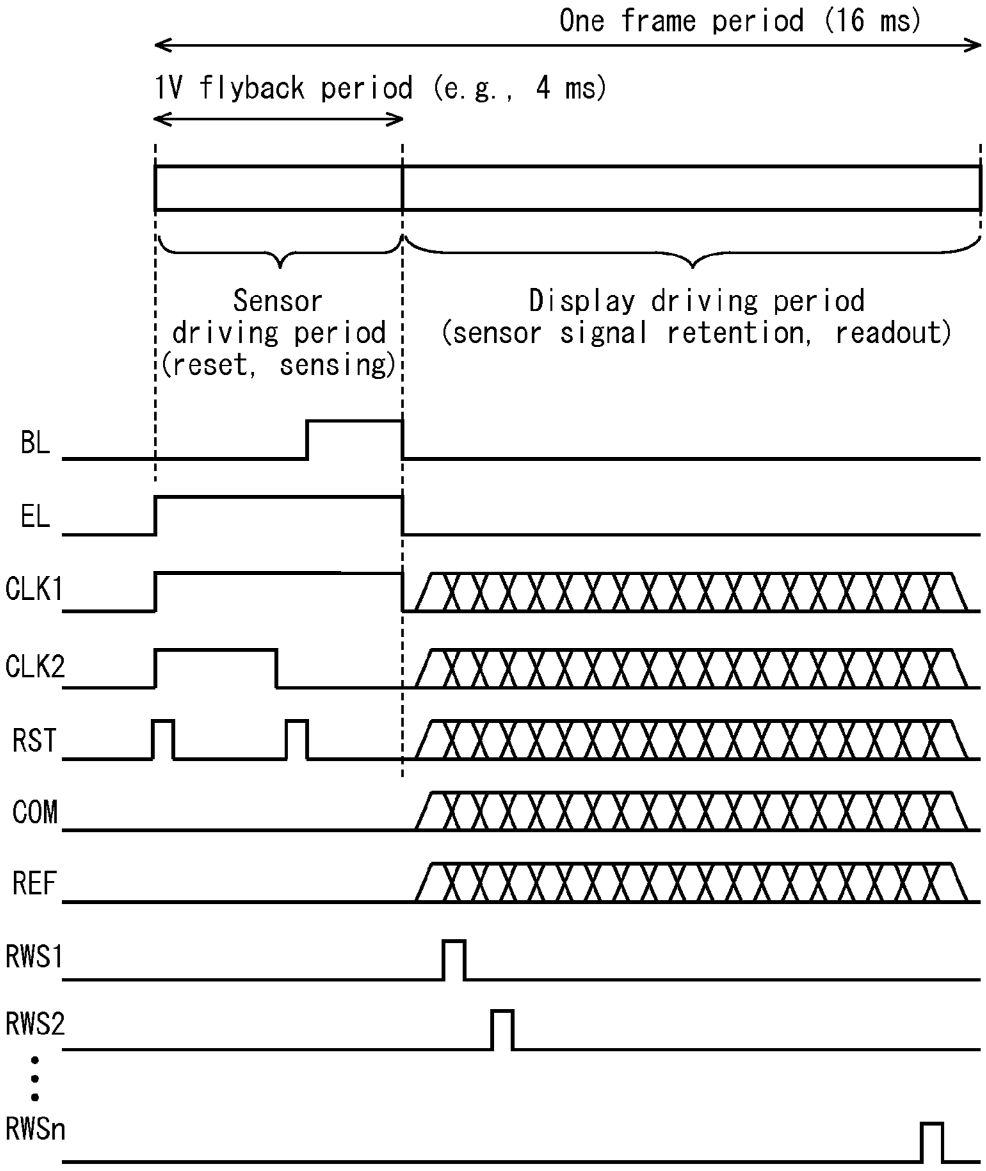
FIG. 17 is a waveform diagram showing signals supplied to the sensor pixel circuits according to Embodiment 5.

FIG. 17 is a waveform diagram showing driving signals of various types supplied to the sensor pixel circuits 9.

As shown in FIG. 17, the clock signal lines CLK1 and CLK2 applied to the sensor pixel circuits 9 rise to the high levels once each in one frame period. The clock signal CLK1 maintains the high level during the sensor driving period, and the clock signal CLK2 rises to the high level exclusively in the former half of the sensor driving period. The reset signal RST rises to the high level twice in one frame period.

During the sensor driving period, when the reset signal RST rises to the high level at the first time, the clock signals CLK1 and CLK2 as well as the reset signal RST are at the high levels. The readout signal RWS is at the low level. This causes the transistors T1 and T3 to be turned on, and causes the potential of the cathode (referred to as the "node Vx") of the photodiode D1 to be reset to the reference voltage Vref supplied from the constant voltage line REF. Further, the potential of the accumulation node Vint here is equal to the reference voltage Vref supplied from the constant voltage line REF.

When the reset signal RST switches from the high level to the low level, the OFF signal accumulation period starts. During the OFF signal accumulation period, the clock signals CLK1 and CLK2 are maintained at the high levels. Therefore, the transistors T1 and T3 are in the ON state. When light is incident on the photodiode D1, a current flows from the node Vx via the photodiode D1 to the constant voltage line COM, whereby charges are drawn out of the node Vx. This causes the potential of the node Vx to fall by a degree according to an amount of light that has been incident during the OFF signal accumulation period. It should be noted that as the backlight 3 is in the OFF state, the degree of fall of the potential of the node Vx (ΔVoff) corresponds to the noise component of the photodiode D1.

Here, the node Vx and the accumulation node Vint have the following potentials:

$$Vx=Vref-\Delta Voff$$

$$Vint=Vref$$

Next, during the sensor driving period, the reset signal RST rises to the high level again. Here, the clock signal CLK1 is maintained at the high level, while the clock signal CLK2 is at the low level. Here, the readout signal RWS is at the low level. The clock signal CLK2 assuming the low level causes the transistor T3 to be turned off. This causes the potential of the accumulation node Vint to assume a floating state. In this state, the high-level voltage Vrst_h is supplied from the reset line RST, and the potential of the node Vx is reset to the reference voltage Vref. On the other hand, the potential of the accumulation node Vint rises by a voltage corresponding to the fall of the potential during the OFF signal accumulation period (ΔVoff). In other words, the accumulation node Vint has the following potential:

$$Vint=Vref+\Delta Voff\cdot A$$

where A represents a constant determined according to a capacitance ratio between the capacitor C1 and the capacitor C2.

Thereafter, during the sensor driving period, when the reset signal RST switches from the high level to the low level, the ON signal accumulation period starts. The On signal accumulation period is a period from when the reset signal falls to the low level at the second time during the sensor driving period until the clock signal CLK1 switches from the high level to the low level. During the ON signal accumulation period, the clock signal CLK1 is at the high level, and the clock signal CLK2 is at the low level. The reset signal RST is at the low level. The readout signal RWS is at the low level. It should be noted that during this ON signal accumulation period, the backlight 3 is turned on. During the ON signal accumulation period, when light is incident on the photodiode D1, an ON current (a photoelectric current of the photodiode D1) flows from the node Vx via the photodiode D1 to the constant voltage line COM, whereby charges are drawn out of the node Vx. This causes the potential Vx to fall by a degree according to an amount of light that has been incident on the photodiode D1 (external light and backlight light) during the ON signal accumulation period. It should be noted that as the backlight 3 is in the ON state here, the degree of fall of the potential of the node Vx (ΔVon) corresponds to a sum of a component owing to the external light and the backlight light incident on the photodiode D1 and the noise component of the photodiode D1.

Here, the node Vx and the accumulation node Vint have the following potentials:

$$Vx = Vref - (\Delta Voff + \Delta Von)$$

$$\begin{aligned} Vint &= Vref + \Delta Voff \cdot A - (\Delta Voff + \Delta Von)\cdot A \\ &= Vref - \Delta Von \cdot A \end{aligned}$$

These expressions show that according to the present embodiment, at the end of the ON signal accumulation period, the potential of the accumulation node Vint reflects a signal light from which the external light component and the noise component have been removed (the component owing to the backlight light).

During the readout period after the sensor driving period ends, the clock signals CLK1 and CLK2 are at the low levels, the reset signal RST is at the low level, and the readout signal RWS is at the high level. This causes the transistor T2 to form a source follower amplifying circuit that has, as its load, a transistor (not shown) included in the source driver circuit 6, and drives the output line OUT according to the potential of the accumulation nodeVint.

As has been described above, according to the present embodiment, the external light and the noise component are cancelled in the sensor pixel circuit 9, whereby a high-precision sensor output can be obtained.

Further, in the sensor pixel circuit 9 according to the present embodiment, the clock signal CLK, the reset signal RST, and the constant voltages VDD, REF, and COM are supplied via the source lines SL. Therefore, lines that need to be provided as the bus lines for driving the sensor pixel circuit 9 in addition to the bas lines for driving the display pixel circuits 8 are only the sensor control lines EL and the readout lines RWS. Consequently, it is possible to realize high-precision sensor pixel circuits, while suppressing the addition of bus lines. Further, since the addition of bus lines is suppressed, an advantage that the aperture ratio can be maintained at a high level can be achieved also. With a higher aperture ratio, the backlight 3 may have a lower illuminance, which leads to the reduction of power consumption.

Still further, in the sensor pixel circuit 9 according to the present embodiment, the transistors M1 and M2 are provided, which allows the following advantages to be achieved. First, the transistor M1 has a function of preventing the potential (Vc) on the side of the cathode of the photodiode D1 from rising to higher than the reset level. The transistor M1 has a function of preventing the constant voltage lines COM and REF from becoming short-circuited during the display driving period. Further, the transistor M2 has a function of maintaining the OFF state during the display driving period, thereby protecting the potential Vint of the accumulation node from potential fluctuations of the clock line CLK (source line SLr) in the display driving period (retention period before readout).

[Embodiment 6]

Hereinafter, Embodiment 6 of the display device of the present invention is explained. The members having the same functions as those of the above-described embodiments are denoted by the same reference numerals as those in the above-described embodiments, and detailed explanations of the same are omitted.

[Configuration of Sensor Pixel Circuit]

Figure 18:
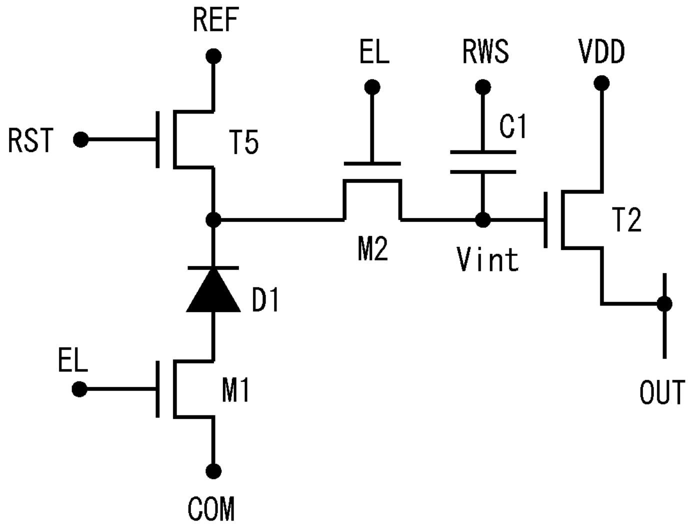
FIG. 18 is a circuit diagram showing a configuration of a sensor pixel circuit according to Embodiment 6.

FIG. 18 is a circuit diagram showing a configuration of the sensor pixel circuit 9 according to Embodiment 6. As shown in FIG. 18, the sensor pixel circuit 9 according to the present embodiment includes a photodiode D1, transistors M1, M2, T2, and T5, as well as a capacitor C1. The transistors T2, T5, M1, and M2 are, for example, N-type TFTs (thin film transistors).

The anode of the photodiode D1 is connected to the drain of the transistor M1, and the cathode thereof is connected to the drain of the transistor T5 and the source of the transistor M2. The gate of the transistor T5 is connected to the reset line RST, the drain thereof is connected to the cathode of the photodiode D1, and the source thereof is connected to the constant voltage line REF. The gates of the transistors M1 and M2 are connected to the sensor control line EL. The source of the transistor M1 is connected to the constant voltage line COM. The drain of the transistor M2 is connected to the gate of the transistor T2. One of the electrodes of the capacitor C1 is connected to the gate of the transistor T2. The other electrode of the capacitor C1 is connected to the readout line RWS. The drain of the transistor T2 is connected to the power source line VDD, and the source thereof is connected to the output line OUT.

Figure 19:
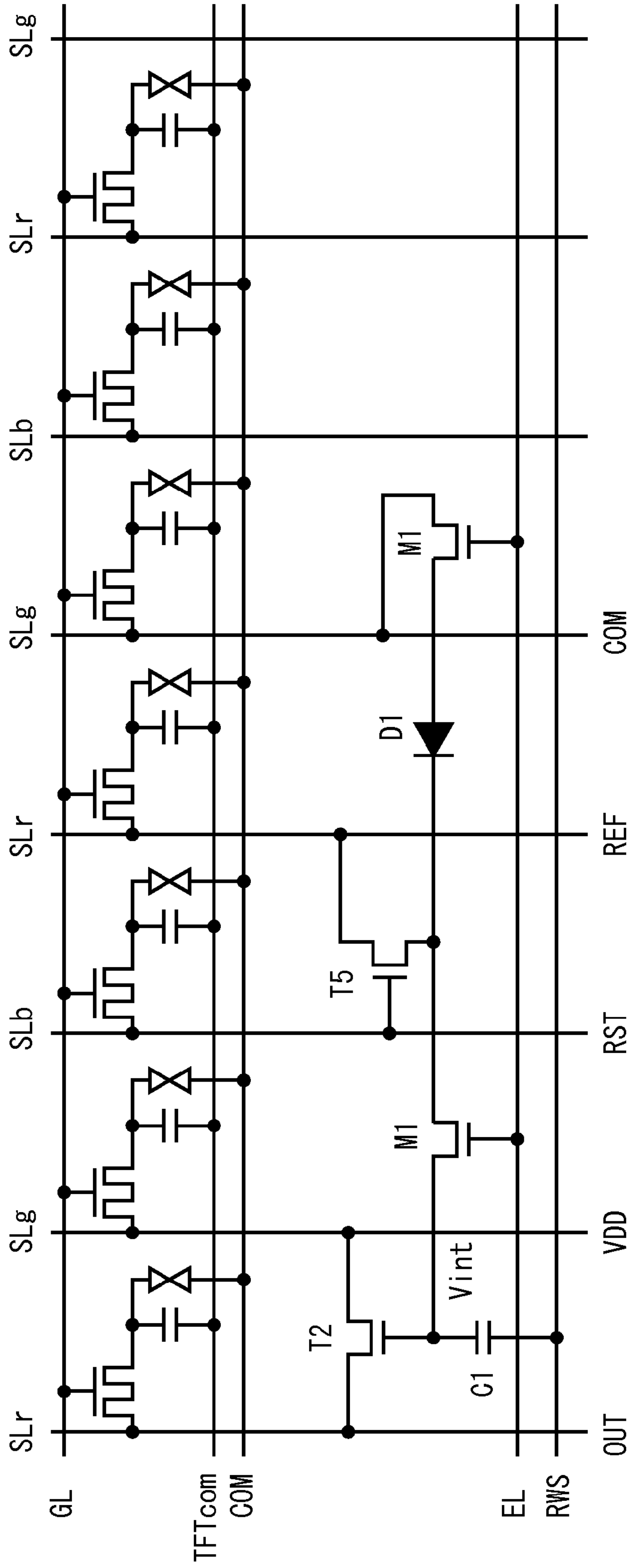
FIG. 19 is a circuit diagram showing an exemplary configuration in the case where the sensor pixel circuit according to Embodiment 6 is integrated inside a pixel.

FIG. 19 is a circuit diagram in the case where the sensor pixel circuit 9 shown in FIG. 18 is integrated in a pixel. As shown in FIG. 19, in the case of the sensor pixel circuit 9 according to Embodiment 6 as well, the sensor control line EL and the readout line RWS are arranged in parallel with the gate line GL. The output line OUT connected to the source of the transistor T2 doubles as the source line SLr connected to the display pixel circuit 8 for red display. The power source line VDD connected to the drain of the transistor T2 doubles as the source line SLg connected to the display pixel circuit 8 for green display. The reset line RST connected to the gate of the transistor T5 doubles as the source line SLb connected to the display pixel circuit 8 for blue display. The constant voltage line REF connected to the source of the transistor T5 doubles as the source line SLr connected to the display pixel circuit 8 for red display. The constant voltage line COM connected to the source of the transistor M1 doubles as the source line SLg connected to the display pixel circuit 8 for green display.

[Operation of Sensor Pixel Circuit]

Figure 20:
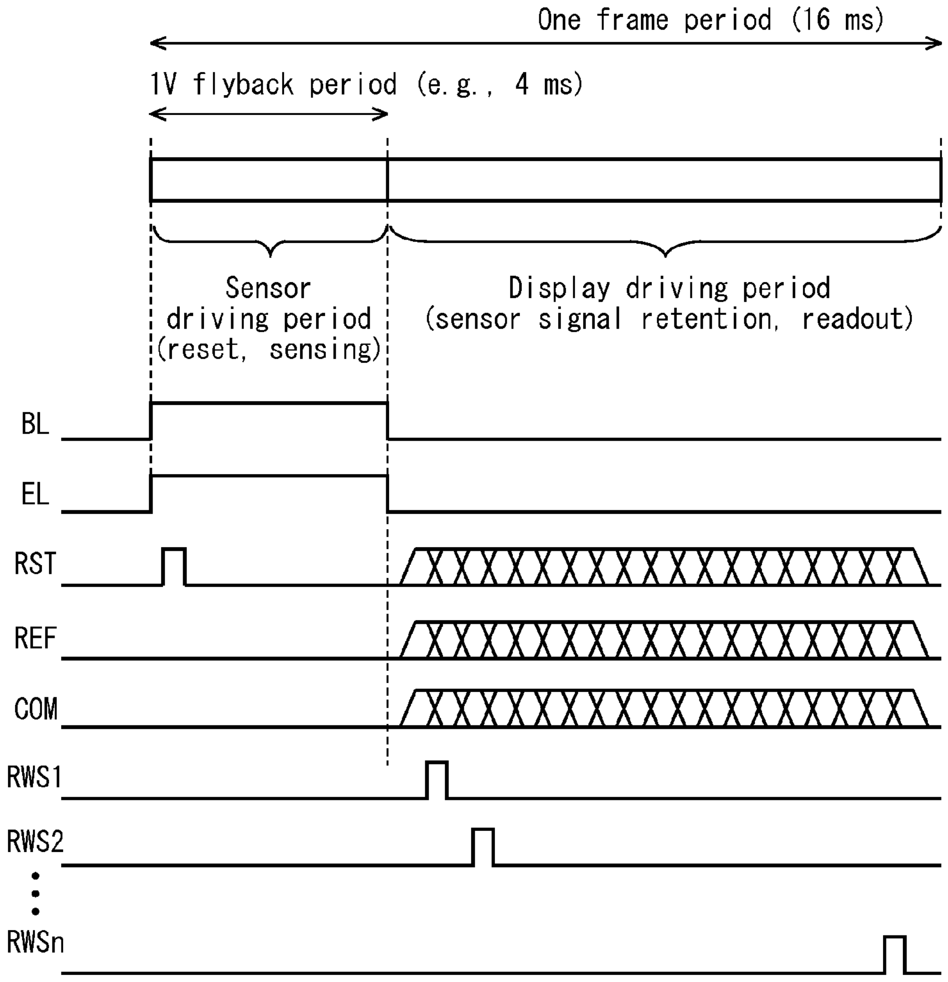
FIG. 20 is a waveform diagram showing signals supplied to the sensor pixel circuits according to Embodiment 6.

FIG. 20 is a waveform diagram showing driving signals of various types supplied to the sensor pixel circuit 9. In the display device according to the present embodiment as well, a sensor driving period during which the resetting and the sensing of the sensor pixel circuits 9 are performed is provided once during one frame period, independently from the display driving period.

In the example shown in FIG. 20, the sensor control signal ET, maintains the high level during the sensor driving period. This causes the transistors M1 and M2 to be in the ON state during the sensor driving period. At the beginning of the sensor driving period, the reset signal RST is at the high level during the predetermined period. The rise of the reset signal RST to the high level causes the transistor T5 to be turned on, thereby causing the potential Vint of the accumulation node is reset to the reference voltage Vref.

The period from when the reset signal RST switches from the high level to the low level until the sensor control signal ET, switches from the high level to the low level is the sensing period (accumulation period) of the sensor pixel circuit 9. In this sensing period, when light is incident on the photodiode D1, the potential Vint of the accumulation node falls by a degree according to an amount of light that has been incident during this accumulation period, and charges are accumulated in the capacitor C1. It should be noted that in the present embodiment, the backlight 3 is in the ON state during the sensor driving period.

When the sensor control signal ET, switches from the high level to the low level and the accumulation period ends, the transistors M1 and M2 are turned off, and the potential Vint of the accumulation node maintains the level at the end of the accumulation period.

During the display driving period, the sensor control signal EL maintains the low level. This causes the transistors M1 and M2 to be maintained in the OFF state during the display driving period. During the display driving period, as shown in FIG. 20, the high-level potential for readout is supplied to the readout lines RWS1 to RWSn sequentially. This supply of the high-level potential for readout causes the potential Vint of the accumulation node to rise by (Cqa/Cpa) time the amplitude of the high-level potential (where Cpa represents a value of a capacitance of one sensor pixel circuit as a whole, and Cqa represents a value of a capacitance of the capacitor C1). The transistor T2 forms a source follower amplifying circuit that has, as its load, a transistor (not shown) included in the source driver circuit 6, and drives the output line OUT according to the potential Vint.

In the sensor pixel circuit 9 according to the present embodiment, the reset signal RST, and the constant voltages REF and COM are supplied via the source lines SL. Therefore, lines that need to be provided as the bus lines for driving the sensor pixel circuit 9 in addition to the bas lines for driving the display pixel circuits 8 are only the sensor control lines EL and the readout lines RWS. Consequently, it is possible to realize high-precision sensor pixel circuits, while suppressing the addition of bus lines. Further, since the addition of bus lines is suppressed, an advantage that the aperture ratio can be maintained at a high level can be achieved also.

Further, in the sensor pixel circuit 9 according to the present embodiment, the transistors M1 and M2 are provided, which allows the following advantages to be achieved. First, the transistor M1 has a function of preventing the constant voltage lines COM and REF from becoming short-circuited during the display driving period. Further, the transistor M2 has a function of maintaining the OFF state during the display driving period, thereby protecting the potential Vint of the accumulation node from potential fluctuations of the source line in the display driving period (retention period before readout).

[Embodiment 7]

Hereinafter, Embodiment 7 of the display device of the present invention is explained. The members having the same functions as those of the above-described embodiments are denoted by the same reference numerals as those in the above-described embodiments, and detailed explanations of the same are omitted.

[Configuration of Sensor Pixel Circuit]

Figure 21:
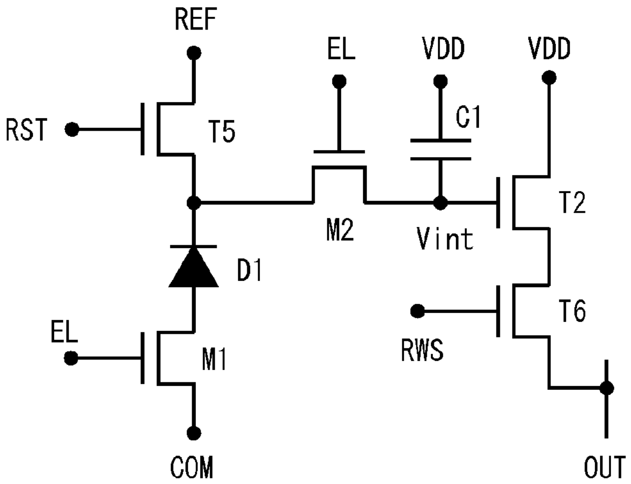
FIG. 21 is a circuit diagram showing a configuration of a sensor pixel circuit according to Embodiment 7.

FIG. 21 is a circuit diagram showing a configuration of the sensor pixel circuit 9 according to Embodiment 7. As shown in FIG. 21, the sensor pixel circuit 9 according to the present embodiment has a configuration obtained by adding a transistor T6 to the sensor pixel circuit 9 according to Embodiment 6. The transistor T6 is, for example, an N-type TFT (thin film transistor).

The gate of the transistor T6 is connected to the readout line RWS. One of the electrodes of the capacitor C1 is connected to the gate of the transistor T2, and the other electrode thereof is connected to the constant voltage line VDD. The drain of the transistor T6 is connected to the source of the transistor T2, and the source of the transistor T6 is connected to the output line OUT.

Figure 22:
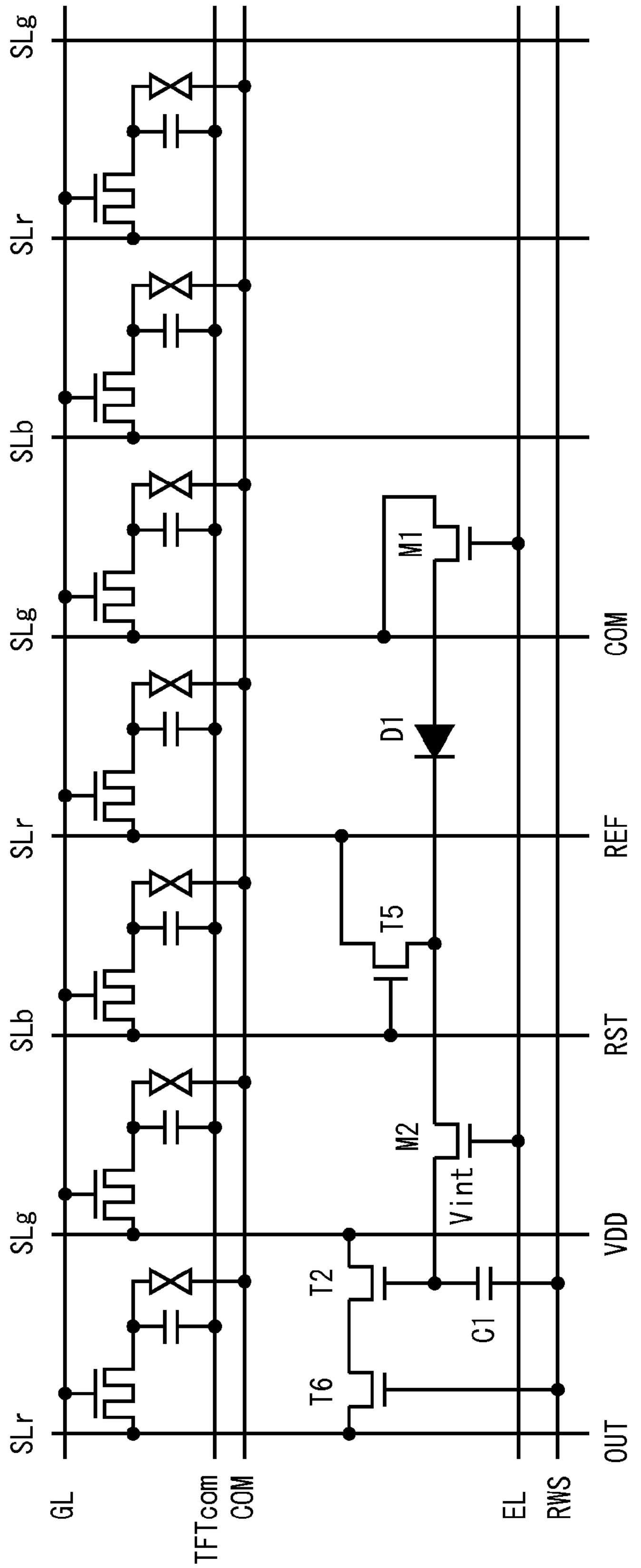
FIG. 22 is a circuit diagram showing an exemplary configuration in the case where the sensor pixel circuit according to Embodiment 7 is integrated inside a pixel.

FIG. 22 is a circuit diagram in the case where the sensor pixel circuit 9 shown in FIG. 21 is integrated in a pixel. As shown in FIG. 22, in the case of the sensor pixel circuit 9 according to Embodiment 7 as well, the sensor control line EL and the readout line RWS are arranged in parallel with the gate line GL. The output line OUT connected to the source of the transistor T6 doubles as the source line SLr connected to the display pixel circuit 8 for red display. The power source line VDD connected to the drain of the transistor T2 doubles as the source line SLg connected to the display pixel circuit 8 for green display. The reset line RST connected to the gate of the transistor T5 doubles as the source line SLb connected to the display pixel circuit 8 for blue display. The constant voltage line REF connected to the source of the transistor T5 doubles as the source line SLr connected to the display pixel circuit 8 for red display. The constant voltage line COM connected to the source of the transistor M1 doubles as the source line SLg connected to the display pixel circuit 8 for green display.

[Operation of Sensor Pixel Circuit]

Figure 23:
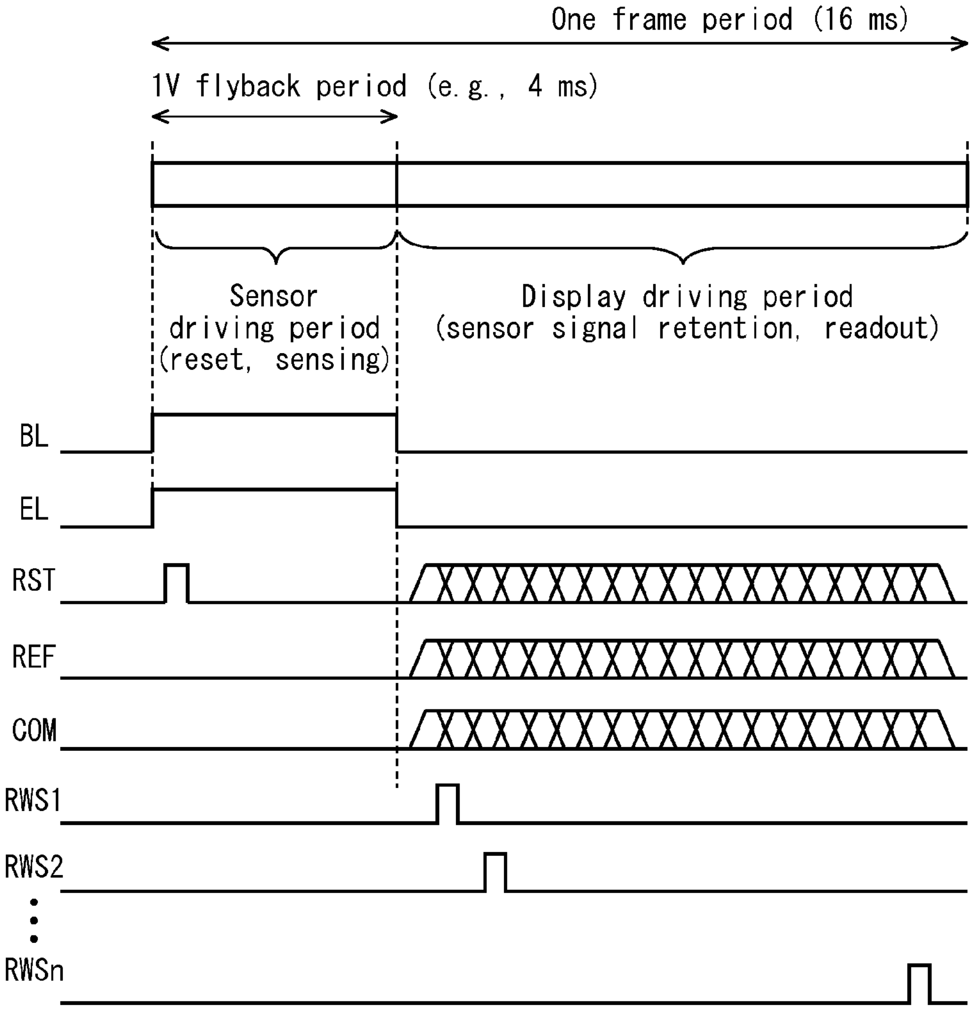
FIG. 23 is a waveform diagram showing signals supplied to the sensor pixel circuits according to Embodiment 7.

FIG. 23 is a waveform diagram showing driving signals of various types supplied to the sensor pixel circuit 9. In the display device according to the present embodiment as well, a sensor driving period during which the resetting and the sensing of the sensor pixel circuits 9 are performed is provided once during one frame period, independently from the display driving period.

In the example shown in FIG. 23, the sensor control signal EL maintains the high level during the sensor driving period. This causes the transistors M1 and M2 to be in the ON state during the sensor driving period. At the beginning of the sensor driving period, the reset signal RST is at the high level during the predetermined period. The rise of the reset signal RST to the high level causes the transistor T5 to be turned on, thereby causing the potential Vint of the accumulation node to be reset to the reference voltage Vref.

The period from when the reset signal RST switches from the high level to the low level until the sensor control signal EL switches from the high level to the low level is the sensing period (accumulation period) of the sensor pixel circuit 9. In this sensing period, when light is incident on the photodiode D1, the potential Vint of the accumulation node falls by a degree according to an amount of light that has been incident during this accumulation period, and charges are accumulated in the capacitor C1. It should be noted that in the present embodiment, the backlight 3 is in the ON state during the sensor driving period.

When the sensor control signal EL switches from the high level to the low level and the accumulation period ends, the transistors M1 and M2 are turned off, and the potential Vint of the accumulation node maintains the level at the end of the accumulation period.

During the display driving period, the sensor control signal EL maintains the low level. This causes the transistors M1 and M2 to be maintained in the OFF state during the display driving period. During the display driving period, as shown in FIG. 23, the high-level potential for readout is supplied to the readout lines RWS1 to RWSn sequentially. This supply of the high-level potential for readout causes the transistor T6 to be turned on. The transistors T2 and T6 form a source follower amplifying circuit that has, as its load, a transistor (not shown) included in the source driver circuit 6, and drives the output line OUT according to the potential Vint.

In the sensor pixel circuit 9 according to the present embodiment, the reset signal RST, and the constant voltages REF and COM are supplied via the source lines SL. Therefore, lines that need to be provided as the bus lines for driving the sensor pixel circuit 9 in addition to the bas lines for driving the display pixel circuits 8 are only the sensor control lines EL and the readout lines RWS. Consequently, it is possible to realize high-precision sensor pixel circuits, while suppressing the addition of bus lines. Further, since the addition of bus lines is suppressed, an advantage that the aperture ratio can be maintained at a high level can be achieved also. With a higher aperture ratio, the backlight 3 may have a lower illuminance, which leads to the reduction of power consumption.

Further, in the sensor pixel circuit 9 according to the present embodiment, the transistors M1 and M2 are provided, which allows the following advantages to be achieved. First, the transistor M1 has a function of preventing the constant voltage lines COM and REF from becoming short-circuited during the display driving period. Further, the transistor M2 has a function of maintaining the OFF state during the display driving period, thereby protecting the potential Vint of the accumulation node from potential fluctuations of the source line in the display driving period (retention period before readout).

[Embodiment 8]

Hereinafter, Embodiment 8 of the display device of the present invention is explained. The members having the same functions as those of the above-described embodiments are denoted by the same reference numerals as those in the above-described embodiments, and detailed explanations of the same are omitted.

Figure 24:
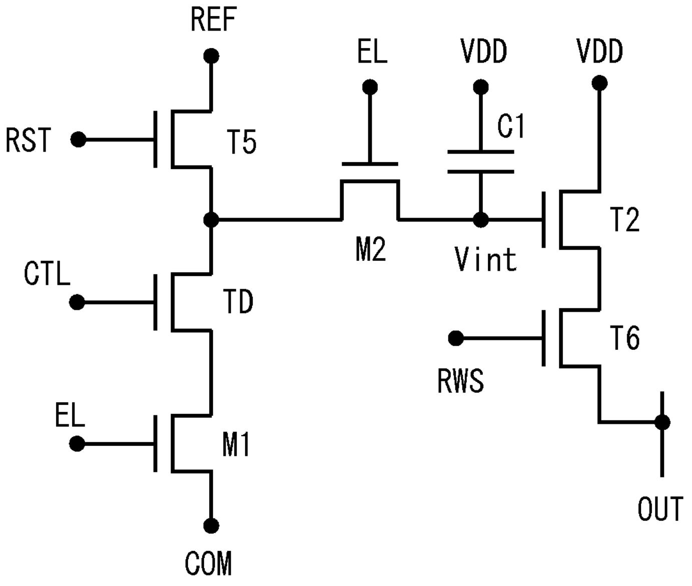
FIG. 24 is a circuit diagram showing a configuration of a sensor pixel circuit according to Embodiment 8.

FIG. 24 is a circuit diagram showing a configuration of a sensor pixel circuit 9 according to Embodiment 8. As shown in FIG. 24, the sensor pixel circuit 9 according to the present embodiment has a configuration obtained by replacing the photodiode D1 with a phototransistor TD in the sensor pixel circuit 9 according to Embodiment 7. The phototransistor TD is, for example, an N-type TFT (thin film transistor). This results in that all the transistors included in the sensor pixel circuit 9 are N-type transistors. Therefore, the sensor pixel circuit 9 can be produced by single channel processing for producing only N-type transistors. The gate of the phototransistor TD is connected to a control line CTL so that an electric current flowing through the phototransistor TD is controlled.

Figure 25:
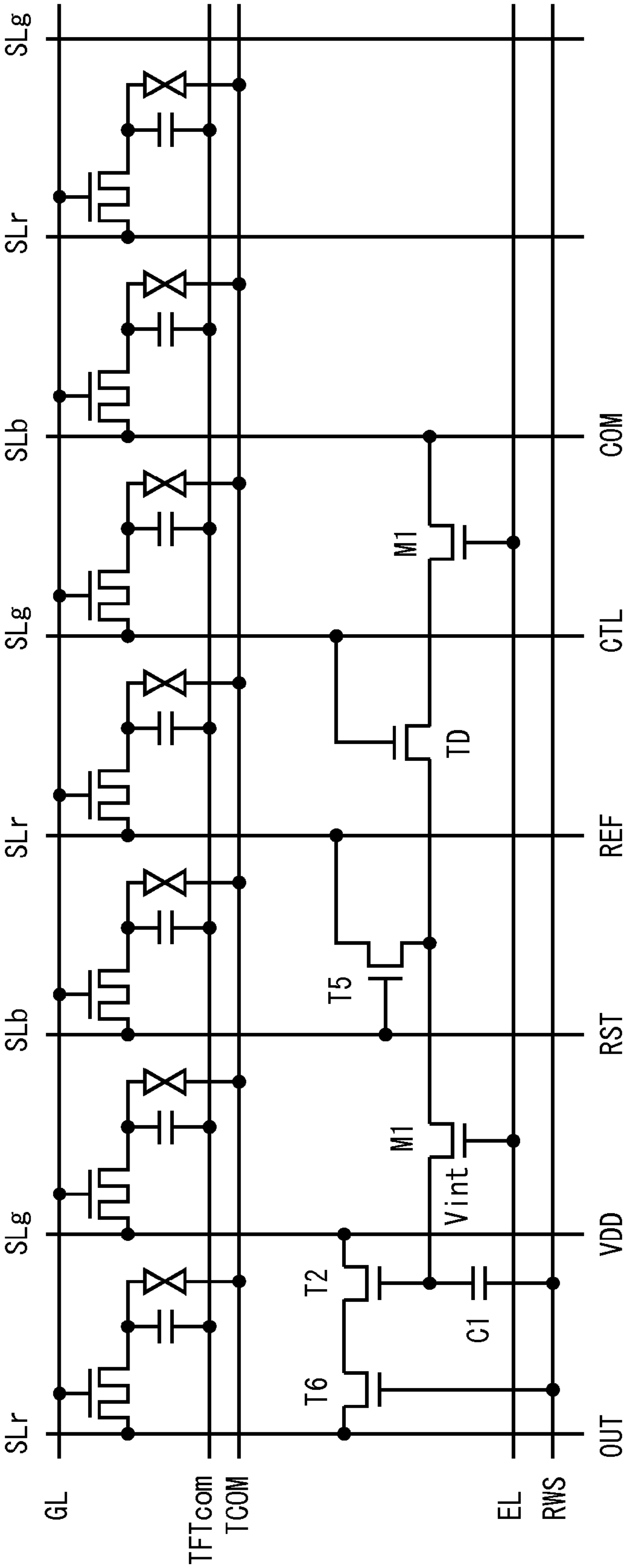
FIG. 25 is a circuit diagram showing an exemplary configuration in the case where the sensor pixel circuit according to Embodiment 8 is integrated inside a pixel.

FIG. 25 is a circuit diagram in the case where the sensor pixel circuit 9 shown in FIG. 24 is integrated in a pixel. As shown in FIG. 25, in the case of the sensor pixel circuit 9 according to Embodiment 7 as well, the sensor control line EL and the readout line RWS are arranged in parallel with the gate line GL. The output line OUT connected to the source of the transistor T6 doubles as the source line SLr connected to the display pixel circuit 8 for red display. The power source line VDD connected to the drain of the transistor T2 doubles as the source line SLg connected to the display pixel circuit 8 for green display. The reset line RST connected to the source of the transistor T5 doubles as the source line SLb connected to the display pixel circuit 8 for blue display. The constant voltage line REF connected to the source of the transistor T5 doubles as the source line SLr connected to the display pixel circuit 8 for red display. The constant voltage line COM connected to the source of the transistor M1 doubles as the source line SLb connected to the display pixel circuit 8 for blue display. The control line CTL connected to the gate of the phototransistor TD is connected to the source line SLg connected to the display pixel circuit 8 for green display.

[Operation of Sensor Pixel Circuit]

Figure 26:
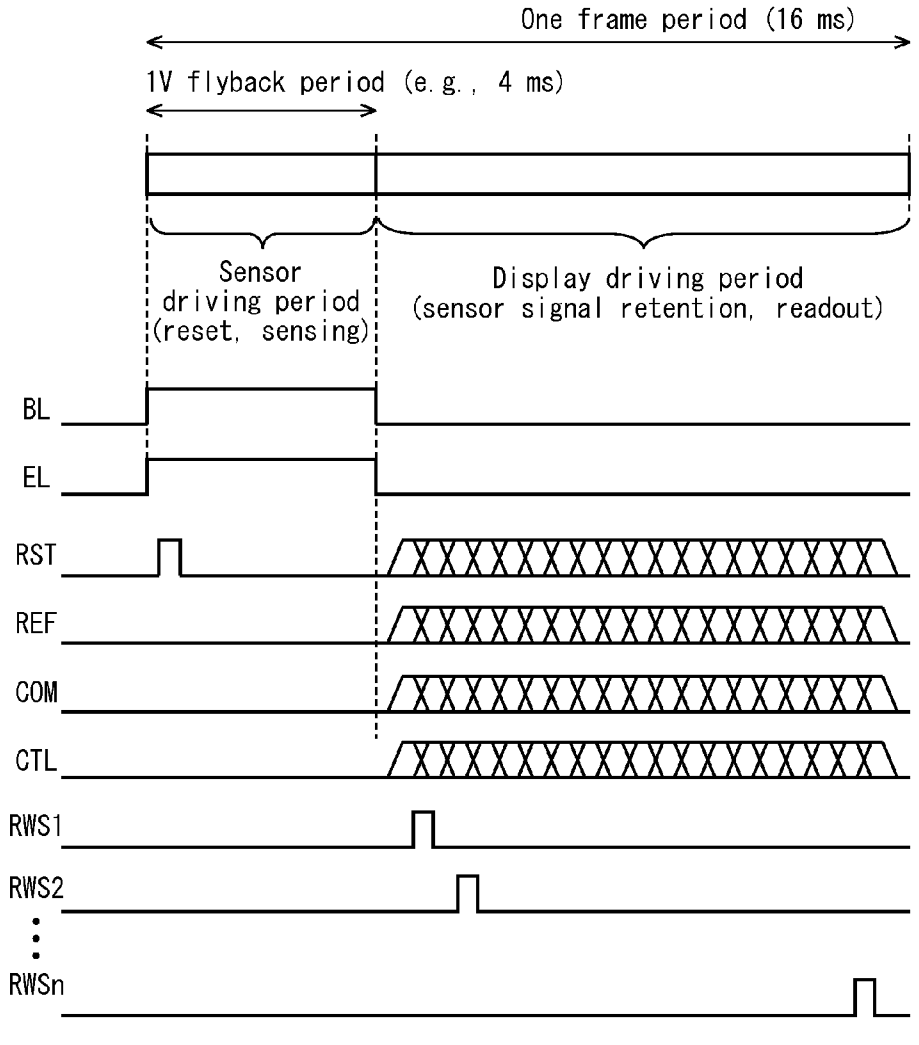
FIG. 26 is a waveform diagram showing signals supplied to the sensor pixel circuits according to Embodiment 8.

FIG. 26 is a waveform diagram showing driving signals of various types supplied to the sensor pixel circuit 9. The driving of the sensor pixel circuit 9 according to the present embodiment is identical to that of Embodiment 7, and therefore, the explanation of the same is omitted here.

In the sensor pixel circuit 9 according to the present embodiment, the reset signal RST and the constant voltages REF, COM, and CTL are supplied via the source lines SL. Therefore, lines that need to be provided as the bus lines for driving the sensor pixel circuit 9 in addition to the bas lines for driving the display pixel circuits 8 are only the sensor control lines EL and the readout lines RWS. Consequently, it is possible to realize high-precision sensor pixel circuits, while suppressing the addition of bus lines. Further, since the addition of bus lines is suppressed, an advantage that the aperture ratio can be maintained at a high level can be achieved also. With a higher aperture ratio, the backlight 3 may have a lower illuminance, which leads to the reduction of power consumption.

Still further, in the sensor pixel circuit 9 according to the present embodiment, the transistors M1 and M2 are provided, which allows the following advantages to be achieved. First, the transistor M1 has a function of preventing the constant voltage lines COM and REF from becoming short-circuited during the display driving period. Further, the transistor M2 has a function of maintaining the OFF state during the display driving period, thereby protecting the potential Vint of the accumulation node from potential fluctuations of the source line in the display driving period (retention period before readout).

[Other Modification Examples of Embodiments 1 to 8]

So far Embodiments 1 to 8 of the present invention have been explained. The present invention, however, is not limited to the above-described embodiments, and can be modified variously within the scope of the invention.

In the present invention, the type of the light source provided in the display device is not limited particularly. Therefore, in Embodiments 1 to 8, the backlight that is turned on during the sensor driving period may be a visible-light backlight for display, or may be an invisible-light backlight for sensors (e.g., an infrared-light backlight) provided in addition to a visible light backlight.

In the examples of Embodiments 1 to 4 described above, the ON signal is obtained by turning on the backlight 3 in the former half of the sensor driving period and the OFF signal is obtained by turning off the backlight 3 in the latter half of the same. However, the backlight may be turned on and off in an opposite manner, i.e., turned off in the former half of the sensor driving period, and turned on in the latter half of the same.

Further, in the examples of Embodiments 1 to 4 described above, the OFF signal obtained by the second sensor pixel circuit is subtracted from the ON signal obtained by the first sensor pixel. However, for example, in the case where noises are tolerated, the configuration may be such that ON signals are obtained from all of the sensor pixel circuits in the pixel region 4, and the ON signals are used without any change as the sensor outputs.

INDUSTRIAL APPLICABILITY

The present invention is industrially applicable as a display device that has an optical sensor function.

The invention claimed is:

1. A display device including an active matrix substrate, the display device comprising a display pixel circuit and a sensor pixel circuit that are provided in a pixel region of the active matrix substrate, wherein the sensor pixel circuit includes:

a light receiving element;

an accumulation node for accumulating charges corresponding to an amount of light incident on the light receiving element; and a readout switching element that reads out charges in the accumulation node, the display device further comprising;

a driving circuit that supplies a sensor driving signal for controlling a resetting operation and an accumulating operation of the accumulation node, to the sensor pixel circuit, via a source line for supplying a display data signal to the display pixel circuit; and a protection switching element connected to a sensor control line provided in addition to the source line, the protection switching element protecting the sensor signal of the sensor pixel circuit;

wherein the sensor pixel circuit further includes a control switching element including a source connected to the light receiving element and a drain, wherein the protection switching element includes:

a first protection switching element including a drain connected to the light receiving element and a source connected to a source line for supplying a reset voltage to the light receiving element; and a second protection switching element including a source connected to the drain of the control switching element and a drain connected to the accumulation node.

2. The display device according to claim 1, wherein the sensor control line is provided perpendicularly to the source line in the pixel region.

3. The display device according to claim 1, wherein the driving circuit performs a sensor driving signal for controlling the resetting operation and the accumulating operation, in a flyback period in a period for driving the display pixel circuit.

4. The display device according to claim 3, wherein the driving circuit performs a sensor driving signal for controlling the resetting operation and the accumulating operation, in a vertical flyback period in a period for driving the display pixel circuit.

5. The display device according to claim 1, further comprising:

a counter substrate opposed to the active matrix substrate; and liquid crystal interposed between the active matrix substrate and the counter substrate.

* * * * *